United States Patent
Kawamata et al.

(10) Patent No.: US 8,283,001 B2
(45) Date of Patent: *Oct. 9, 2012

(54) LIQUID CRYSTAL COMPOUND AND PROCESS FOR PRODUCTION THEREOF, LIQUID CRYSTAL COMPOSITION, AND LIQUID CRYSTAL ELECTROOPTICAL ELEMENT

(75) Inventors: Atsushi Kawamata, Chigasaki (JP); Tomoyuki Asai, Chigasaki (JP); Hidemasa Koh, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,928

(22) Filed: May 2, 2011

(65) Prior Publication Data

US 2012/0050661 A1 Mar. 1, 2012

Related U.S. Application Data

(63) Continuation-in-part of application No. PCT/JP2009/068322, filed on Oct. 26, 2009.

(30) Foreign Application Priority Data

Oct. 30, 2008 (JP) ................................. 2008-279647

(51) Int. Cl.
C09K 19/30 (2006.01)
C09K 19/12 (2006.01)
C09K 19/16 (2006.01)
C07C 43/215 (2006.01)
C07C 43/225 (2006.01)
C07C 25/13 (2006.01)

(52) U.S. Cl. ............... 428/1.1; 252/299.63; 252/299.66; 568/645; 568/647; 570/128

(58) Field of Classification Search .................... 428/1.1; 252/299.62, 299.63, 299.66; 568/645, 647; 570/128

See application file for complete search history.

(56) References Cited

U.S. PATENT DOCUMENTS

| 6,329,027 | B1 | 12/2001 | Kondo et al. |
| 6,605,747 | B2 * | 8/2003 | Kondo et al. .................. 568/642 |
| 6,827,876 | B2 * | 12/2004 | Kondo et al. ............... 252/299.6 |
| 6,864,397 | B2 * | 3/2005 | Kondo et al. .................. 568/647 |
| 2002/0119260 | A1 | 8/2002 | Matsui et al. |
| 2002/0120168 | A1 * | 8/2002 | Kondo et al. .................... 568/39 |
| 2003/0136944 | A1 | 7/2003 | Takehara et al. |
| 2004/0016906 | A1 * | 1/2004 | Kondo et al. ............. 252/299.63 |
| 2005/0006624 | A1 | 1/2005 | Kato et al. |
| 2010/0140547 | A1 | 6/2010 | Nagashima et al. |

FOREIGN PATENT DOCUMENTS

| JP | 3-41037 A | 2/1991 |
| JP | 5-112778 A | 5/1993 |
| JP | 2000-169413 A | 6/2000 |
| JP | 2003-2858 A | 1/2003 |
| JP | 2005-298466 A | 10/2005 |
| JP | 2008-156352 A | 7/2008 |
| WO | WO 2008/111417 A1 | 9/2008 |

OTHER PUBLICATIONS

International Preliminary Report on Patentability and Written Opinion issued Jun. 7, 2011, in PCT/JP2009/068322.
Atsushi Kawamata et al., "Synthesis and Properties of Novel Liquid Crystals Having a Fluorinated Allyl Ether Moiety", Presentation Document of the 23$^{rd}$ International Liquid Crystal Conference, Jul. 12, 2010, 1 Page.
Atsushi Kawamata et al., "Synthesis and Properties of Liquid Crystals Having a Fluorinated Allyl Oxy Linkage", the Presentation Document of Japanese Liquid Crystal Society Conference 2010, Sep. 7, 2010, 17 Pages (with English Translation).
U.S. Appl. No. 13/098,901, filed May 2, 2011, Kawamata, et al.
U.S. Appl. No. 13/142,148, filed Jun. 24, 2011, Yaguchi, et al.

* cited by examiner

*Primary Examiner* — Shean C Wu
(74) *Attorney, Agent, or Firm* — Oblon, Spivak, McClelland, Maier & Neustadt, L.L.P.

(57) ABSTRACT

Disclosed is a liquid crystal composition suitable for producing a liquid crystal electrooptical element which can be driven at a low voltage in a wide temperature range and has high display quality. Also disclosed is a liquid crystal electrooptical element produced by using the liquid crystal composition. Further disclosed is a liquid crystal compound useful in preparing this composition.

24 Claims, No Drawings

LIQUID CRYSTAL COMPOUND AND PROCESS FOR PRODUCTION THEREOF, LIQUID CRYSTAL COMPOSITION, AND LIQUID CRYSTAL ELECTROOPTICAL ELEMENT

CONTINUING APPLICATION INFORMATION

This application is a continuation-in-part of International Application No. PCT/JP2009/068322, filed on Oct. 26, 2009. This application also claims priority to Japanese application No. 2008-279647, filed on Oct. 30, 2008. Each of those applications is incorporated herein by reference.

TECHNICAL FIELD

This invention relates to a liquid crystal compound and its production method. This invention also relates to a liquid crystal composition and a liquid crystal display element containing the liquid crystal compound.

BACKGROUND ART

Liquid crystal elements are used in mobile equipment such as mobile phone and PDA, display for OA equipment such as copying machine and PC monitor, display for home appliance such as TV, as well as clock, calculator, measuring instrument, automobile instruments, camera, and the like, and the liquid crystal elements are required to fulfill various performances including wide operating temperature range, low operating voltage, high-speed responsivity, and chemical stability.

A material exhibiting liquid crystal phase is used in these liquid crystal elements. Until now, however, the required performances are not realized by one single compound fulfilling all required properties but by way of a liquid crystal composition prepared by mixing two or more liquid crystal compounds or non-liquid crystal compounds each exhibiting one or more excellent properties.

Of the many properties required for the liquid crystal compound used in the liquid crystal composition in the field of the liquid crystal element, it is an important issue to provide a liquid crystal compound or a liquid crystal composition which has excellent compatibility with other liquid crystal material or non-liquid crystal material and improved chemical stability, and which also enables operation of the liquid crystal element at a low voltage with a high-speed responsivity in a wide operating temperature range when used for a liquid crystal element.

As a measure for solving such problem, a compound containing CF=CF linkage group and a compound containing $CF_2O$ linkage group have been used (Patent Literatures 1 and 2).

However, the compound containing CF=CF linkage group has the problem of the lack of photostability while the compound containing $CF_2O$ linkage group has the problem that the $CF_2O$ is decomposed when the compound has particular structures.

CITATIONS

Patent Literature 1: JP 03-041037 A
Patent Literature 2: JP 05-112778 A

SUMMARY OF THE INVENTION

An object of the present invention is to provide a liquid crystal compound which has an excellent compatibility with other liquid crystal material or non-liquid crystal material and an improved chemical stability. Another object of the present invention is to provide its production method. Yet another object of the present invention is to provide a liquid crystal compound which has, in addition to the above-described properties, a large dielectric anisotropy by selecting the respective groups contained in the liquid crystal compound. Another object of the present invention is to provide compounds having a dielectric anisotropy near zero or a highly negative dielectric anisotropy.

A further object of the present invention is to provide a liquid crystal composition containing such liquid crystal compound which is well adapted for use in producing a liquid crystal electrooptical element which can be operated at a low voltage in a wide operating temperature range with high display quality. A still further object of the present invention is to provide a liquid crystal electrooptical element produced by using such liquid crystal composition.

In view of the situation as described above, the inventors of the present invention conducted an intensive study, and found that a compound having a particular structure having CF=$CFCF_2O$ linkage group is a compound useful for realizing various performances such as wide operating temperature range, low operating voltage, high-speed responsivity, chemical stability, and the like required for the liquid crystal electrooptical element when such compound is incorporated in the liquid crystal composition and the liquid crystal composition is used in the liquid crystal electrooptical element.

Accordingly, the present invention provides a liquid crystal compound represented by the following formula (1):

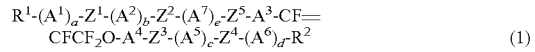

$$R^1\text{-}(A^1)_a\text{-}Z^1\text{-}(A^2)_b\text{-}Z^2\text{-}(A^7)_e\text{-}Z^5\text{-}A^3\text{-}CF= CFCF_2O\text{-}A^4\text{-}Z^3\text{-}(A^5)_c\text{-}Z^4\text{-}(A^6)_d\text{-}R^2 \quad (1)$$

As noted above, the compounds of the present invention may have a dielectric anisotropy near zero or a highly negative dielectric anisotropy.

The symbols of the formula (1) indicate following meaning.

$R^1$ and $R^2$: They independently represent hydrogen atom, a halogen atom, —CN, —NCS, —$SF_5$, or an alkyl group containing 1 to 18 carbon atoms. At least one hydrogen atom in the group is optionally substituted with fluorine atom. At least one —$CH_2$— in the group is optionally substituted with ethereal oxygen atom or thioethereal sulfur atom. At least one —$CH_2CH_2$— in the group is optionally substituted with —CH=CH— or —C≡C—.

$A^1, A^2, A^3, A^4, A^5, A^6$ and $A^7$: They independently represent trans-1,4-cyclohexylene group, 1,4-cyclohexenylene group, 1,3-cyclobutylene group, 1,2-cyclopropylene group, naphthalene-2,6-diyl group, 1,2,3,4-tetrahydronaphthalene-2,6-diyl group, decahydronaphthalene-2,6-diyl group, or 1,4-phenylene group. At least one hydrogen atom in the group is optionally substituted with a halogen atom. One or two =CH— in the group is optionally substituted with nitrogen atom. One or two —$CH_2$— in the group is optionally substituted with ethereal oxygen atom or thioethereal sulfur atom.

$Z^1, Z^2, Z^3, Z^4$, and $Z^5$: They independently represent single bond, an alkylene group containing 1 to 4 carbon atoms. At least one hydrogen atom in the group is optionally substituted with fluorine atom. At least one —$CH_2$— in the group is optionally substituted with ethereal oxygen atom or thioethereal sulfur atom. At least one —$CH_2CH_2$— in the group is optionally substituted with —CH=CH— or —C≡C—.

a, b, c, d, and e: They independently represent 0 or 1 with the proviso that 0≦a+b+c+d+e≦3.

A preferred liquid crystal compound represented by the formula (1) is the compound represented by the following formula (1-0):

   (1-0)

The symbols of the formula (1-0) indicate following meaning.

In the compound (1-0), $R^1$, $R^2$, $Z^1$, $Z^2$, $Z^3$, $Z^4$, a, b and C are as defined above, with the proviso that $0 \leq a+b+c+d \leq 3$.

A preferred liquid crystal compound represented by the formula (1-0) is the compound represented by the following formula (1-1):

formula (1-1):

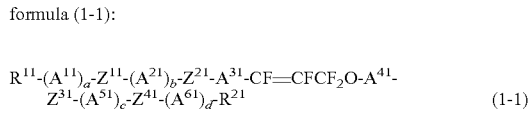   (1-1)

The symbols of the formula (1-1) indicate following meaning.

$R^{11}$ and $R^{21}$: They independently represent hydrogen atom, fluorine atom, $-SF_5$, or an alkyl group containing 1 to 18 carbon atoms. At least one hydrogen atom in the group is optionally substituted with fluorine atom. At least one $-CH_2-$ in the group is optionally substituted with ethereal oxygen atom or thioethereal sulfur atom. At least one $-CH_2CH_2-$ in the group is optionally substituted with $-CH=CH-$.

$A^{11}$, $A^{21}$, $A^{31}$, $A^{41}$, $A^{51}$, and $A^{61}$: They independently represent trans-1,4-cyclohexylene group or 1,4-phenylene group. At least one hydrogen atom in the group is optionally substituted with a halogen atom. One or two $=CH-$ in the group is optionally substituted with nitrogen atom. One or two $-CH_2-$ in the group is optionally substituted with ethereal oxygen atom or thioethereal sulfur atom.

$Z^{11}$, $Z^{21}$, $Z^{31}$, and $Z^{41}$: They independently represent single bond, an alkylene group containing 1 to 4 carbon atoms. At least one hydrogen atom in the group is optionally substituted with fluorine atom. At least one $-CH_2-$ in the group is optionally substituted with ethereal oxygen atom.

a, b, c, and d are as defined above.

A preferred liquid crystal compound represented by the formula (1-0) is the compound represented by the following formula (1-2):

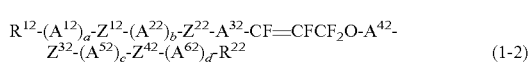   (1-2)

The symbols of the formula (1-2) indicate following meaning.

$R^{12}$: represents hydrogen atom or an alkyl group containing 1 to 10 carbon atoms, wherein at least one hydrogen atom in the group is optionally substituted with fluorine atom, wherein at least one $-CH_2-$ in the group is optionally substituted with ethereal oxygen atom, $R^{22}$: represents hydrogen atom, fluorine atom, $-SF_5$, or an alkyl group containing 1 to 18 carbon atoms, wherein at least one hydrogen atom in the group is optionally substituted with fluorine atom, and at least one $-CH_2-$ in the group is optionally substituted with ethereal oxygen atom, $A^{12}$, $A^{22}$, $A^{32}$, $A^{42}$, $A^{52}$ and $A^{62}$: independently represent trans-1,4-cyclohexylene group, 1,4-phenylene group, or 1,4-phenylene group wherein one or two hydrogen atoms in the group is substituted with fluorine atom, $Z^{12}$, $Z^{22}$, $Z^{32}$ and $Z^{42}$: independently represent single bond or an alkylene group containing 1 to 4 carbon atoms, and a, b, c, and d are as defined above.

A preferred method for producing the liquid crystal compound represented by the formula (1) comprises the step of reacting the compound represented by the following formula (2):

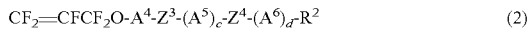   (2)

with the compound represented by the following formula (3):

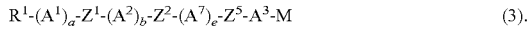   (3).

The symbols of the formulae (2) and (3) are as defined above.

M of the formula (3) is a metal atom or a group containing a metal atom.

The present invention provides a liquid crystal composition containing the liquid crystal compound represented by the formula (1).

The present invention provides a liquid crystal electrooptical element having the liquid crystal composition introduced between two substrates each having an electrode provided thereon.

The liquid crystal compound represented by the formula (1) of the present invention has high compatibility with other liquid crystal material or non-liquid crystal material as well as high chemical stability. The compound of the present invention can be used in preparing a liquid crystal composition which fulfills various performances such as wide operating temperature range, low operating voltage, high-speed responsivity, chemical stability, and the like required for the liquid crystal element by adequately selecting the cyclic group, the substituent, and the linkage group constituting the compound. In addition, when this liquid crystal composition is used in the liquid crystal electrooptical element, the element shows improved high-speed responsivity in a wide temperature range and it can be operated at a low voltage.

According to the production method of the present invention, a compound having $CF=CFCF_2O$ linkage group can be readily and efficiently produced in commercial scale in versatile and convenient manner.

DETAILED DESCRIPTION OF THE INVENTION

Next, the present invention is described in detail.

In the present invention, the liquid crystal compound represented by the formula (1) is referred to as the compound (1), and compounds represented by other formulae are also referred in the same manner.

In the present invention, in the formulae (1) and (3), the position near $R^1$ is always referred to as the position 4 unless otherwise noted, and in the formula (2), the position near $R^2$ is always referred to as the position 1 unless otherwise noted.

Also, in the present invention, "liquid crystal electrooptical element" is not limited to display elements but also includes various functional elements using the electric or optical properties of the liquid crystal, for example, liquid crystal display element, and elements used in application such as smart window, optical shutter, polarization converting element, and varifocal lens.

In the compound (1) having the $CF=CFCF_2O$ linkage group of the present invention, $R^1$ and $R^2$ are as defined above.

It is to be noted that the substitution of the hydrogen atom with the fluorine atom, the substitution of the $-CH_2-$ with the ethereal oxygen atom or the thioethereal sulfur atom, and the substitution of the $-CH_2CH_2-$ with the $-CH=CH-$ or the $-C\equiv C-$ may take place at once at the same alkyl group.

The alkyl group substituted with at least one member selected from fluorine atom, ethereal oxygen atom, and thioethereal sulfur atom is hereinafter referred to as the "substituted alkyl group".

The alkenyl group which is the alkyl group substituted with "—CH═CH—" further substituted with at least one member selected from fluorine atom, ethereal oxygen atom, and thioethereal sulfur atom is hereinafter referred to as the "substituted alkenyl group".

Exemplary substituted alkyl groups include alkoxy group, alkoxyalkyl group, alkylthio group, alkylthioalkyl group, fluoroalkyl group, and fluoroalkoxy group.

Exemplary substituted alkenyl groups include alkenyloxy group, alkenyloxyalkyl group, alkenylthio group, alkenylthioalkyl group, fluoroalkenyl group, and fluoroalkenyloxy group.

$R^1$ and $R^2$ are preferably hydrogen atom, a halogen atom, —CN, —NCS, —SF$_5$, an alkyl group, an alkoxy group, an alkoxyalkyl group, an alkylthio group, an alkylthioalkyl group, an alkenyl group, an alkenyloxy group, an alkenylthio group, a fluoroalkyl group, a fluoroalkoxy group, a fluoroalkoxyalkyl group, a fluoroalkenyl group, or a fluoroalkenylthio group.

Exemplary alkyl groups include methyl group, ethyl group, propyl group, isopropyl group, butyl group, pentyl group, hexyl group, heptyl group, octyl group, nonyl group, and decyl group.

Exemplary alkoxy groups include methoxy group, ethoxy group, propoxy group, butoxy group, pentoxy group, heptyloxy group, and octyloxy group.

Exemplary alkoxyalkyl groups include methoxymethyl group, ethoxymethyl group, propoxymethyl group, propoxyethyl group, methoxypropyl group, ethoxypropyl group, and propoxypropyl group.

Exemplary alkylthio groups include methylthio group, ethylthio group, propylthio group, butylthio group, pentylthio group, hexylthio group, hepthylthio group, and octylthio group.

Exemplary alkylthioalkyl groups include methylthiomethyl group, ethylthiomethyl group, propylthiomethyl group, butylthiomethyl group, methylthioethyl group, ethylthioethyl group, propylthioethyl group, methylthiopropyl group, ethylthiopropyl group, and propylthiopropyl group.

Exemplary alkenyl groups include vinyl group, 1-propenyl group, 1-butenyl group, 1-pentenyl group, 3-butenyl group, and 3-pentenyl group.

Exemplary alkenyloxy groups include allyloxy group.

Exemplary fluoroalkyl groups include trifluoromethyl group, fluoromethyl group, 2-fluoroethyl group, difluoromethyl group, 2,2,2-trifluoroethyl group, 1,1,2,2-tetra fluoroethyl group, 2-fluoroethyl group, 3-fluoropropyl group, 4-fluorobutyl group, and 5-fluoropentyl group.

Exemplary fluoroalkoxy groups include fluoromethoxy group, trifluoromethoxy group, difluoromethoxy group, pentafluoroethoxy group, 1,1,2,2-tetrafluoroethoxy group, heptafluoropropoxy group, and 1,1,2,3,3,3-hexafluoropropoxy group.

Exemplary fluoroalkoxyalkyl groups include trifluoromethoxymethyl group.

Exemplary fluoroalkenyl groups include 2-fluoroethenyl group, 2,2-difluoroethenyl group, 1,2,2-trifluoroethenyl group, 3-fluoro-1-butenyl group, and 4-fluoro-1-butenyl group.

Exemplary fluoroalkenylthio groups include trifluoromethylthio group, difluoromethylthiogroup, 1,1,2,2-tetrafluoroethylthio group, and 2,2,2-trifluoroethylthio group.

$R^1$ and $R^2$ are preferably hydrogen atom, fluorine atom, —SF$_5$, an alkyl group containing 1 to 18 carbon atoms, an alkenyl group containing 2 to 18 carbon atoms, a substituted alkyl group containing 1 to 18 carbon atoms, or a substituted alkenyl group containing 2 to 18 carbon atoms in view of the reactivity and the reduced side reaction.

$R^1$ is most preferably hydrogen atom, an alkyl group containing 10 carbon atoms, or a substituted alkyl group containing 10 carbon atoms.

$R^2$ is most preferably fluorine atom, —SF$_5$, hydrogen atom, an alkyl group containing 10 carbon atoms, or a substituted alkyl group containing 10 carbon atoms.

In the compound (1), $A^1$, $A^2$, $A^3$, $A^4$, $A^5$, $A^6$, and $A^7$ are as defined above.

It is to be noted that the substitution of the hydrogen atom with the halogen atom, the substitution of the ═CH— with the nitrogen atom, and the substitution of the —CH$_2$— with the ethereal oxygen atom or the thioethereal sulfur atom may take place at once at the same group. The halogen atom that may substitute the hydrogen atom in the group is preferably chlorine atom or fluorine atom.

When $A^1$, $A^2$, $A^3$, $A^4$, $A^5$, $A^6$, and $A^7$ are 1,4-phenylene group, the number of halogen atom substituted is 1 to 4, and preferably 1 or 2. When $A^1$, $A^2$, $A^3$, $A^4$, $A^5$, $A^6$, and $A^7$ are trans-1,4-cyclohexylene group, the number of halogen atom substituted is 1 to 4. The halogen atom may also be bonded to the carbon atom at position 1 or 4 of the cyclohexylene group.

Examples of the 1,4-phenylene group having 1 or 2 ═CH— substituted with nitrogen atom include 2,5-pyrimidinylene group and 2,5-pyridinylene group.

Examples of the trans-1,4-cyclohexylene group having 1 or 2 —CH$_2$— substituted with ethereal oxygen atom or thioethereal sulfur atom include 1,3-dioxane-2,5-diyl group and 1,3-dithian-2,5-diyl group.

The 1,4-phenylene group substituted with at least one member selected from halogen atom and nitrogen atom is hereinafter referred to as the "substituted 1,4-phenylene group" and the 1,4-cyclohexylene group substituted with at least one member selected from halogen atom, ethereal oxygen atom, and thioethereal sulfur atom is hereinafter referred to as the "substituted trans-1,4-cyclohexylene group".

$A^1$, $A^2$, $A^3$, $A^4$, $A^5$, $A^6$, and $A^7$ are preferably trans-1,4-cyclohexylene group, 1,4-phenylene group, substituted trans-1,4-cyclohexylene group, or substituted 1,4-phenylene group in view of the reactivity and availability of the starting material.

Among these, the preferred are trans-1,4-cyclohexylene group, 1,4-phenylene group, and 1,4-phenylene group having 1 or 2 hydrogen atoms substituted with fluorine atom.

In the compound (1), $Z^1$, $Z^2$, $Z^3$, $Z^4$, and $Z^5$ are as defined above.

It is to be noted that the substitution of the hydrogen atom with the fluorine atom and the substitution of the —CH$_2$— with the ethereal oxygen atom or the thioethereal sulfur atom may take place at once at the same group.

Exemplary alkylene groups having at least one hydrogen atom in the group substituted with fluorine atom include —CF$_2$CF$_2$—, —CF$_2$CH$_2$—, —CH$_2$CF$_2$—, —CHFCH$_2$—, —CH$_2$CHF—, —CF$_2$CHF—, and —CHFCF$_2$—.

Exemplary alkylene group having at least one —CH$_2$— in the group substituted with ethereal oxygen atom or thioethereal sulfur atom include —CH$_2$O—, —OCH$_2$—, —CH$_2$S—, and —SCH$_2$—.

Exemplary group having the hydrogen atom in the group substituted with the fluorine atom and the —CH$_2$— in the group substituted with the ethereal oxygen atom at once include —CF$_2$O— and —OCF$_2$—.

When the $Z^1$, $Z^2$, $Z^3$, $Z^4$, or $Z^5$ is single bond, it means that the groups on both sides of the $Z^1$, $Z^2$, $Z^3$, $Z^4$, or $Z^5$ are directly bonded to each other. For example, when $Z^1$ is single bond and a and b are 1, $A^1$ and $A^2$ are directly bonded to each other, and when $Z^1$, $Z^2$, and $Z^5$ are single bond and a, b, and e are 0, $R^1$ and $A^3$ are directly bonded to each other.

$Z^1$, $Z^2$, $Z^3$, $Z^4$, and $Z^5$ are preferably single bond, an alkylene group containing 1 to 4 carbon atoms, an alkylene group containing 1 to 4 carbon atoms having at least one hydrogen atom substituted with fluorine atom, or an alkylene group containing 1 to 4 carbon atoms having at least one —$CH_2$— substituted with ethereal oxygen atom, in view of the ease of the synthesis and other reasons.

Among these, the most preferred is the single bond or the alkylene group containing 1 to 4 carbon atoms.

In the compound (1) of the present invention, a, b, c, d, and e are as defined above.

a, b, c, d, and e, however, may be adequately selected depending on the properties required for the compound.

For example, when it is important that the compound (1) has low viscosity or the compound (1) has high compatibility with other liquid crystal material or non-liquid crystal material, it is preferable that $0 \leq a+b+c+d+e \leq 1$. On the other hand, when the high liquid crystal temperature range of the compound (1) is important, it is preferable that $1 \leq a+b+c+d+e \leq 3$.

In order to have a high positive $\Delta \in$ of the compound (1), it is believed that the "-$A^4$-$Z^3$-$(A^5)_c$-$Z^4$-$(A^6)_d$-$R^2$" on the oxygen side of the CF=CF—$CF_2$O is preferably an electron-withdrawing group. The electron-withdrawing property of this "-$A^4$-$Z^3$-$(A^5)_c$-$Z^4$-$(A^6)_d$-$R^2$" means that, in the compound (1), "-$A^4$-$Z^3$-$(A^5)_c$-$Z^4$-$(A^6)_d$-$R^2$" has an electron-withdrawing property higher than that of the "-$A^4$-$Z^3$-$(A^5)_c$-$Z^4$-$(A^6)_d$-$R^2$" wherein c=d=0, $R^2$ in the "-$A^4$-$R^2$" is hydrogen atom, and $A^4$ is unsubstituted phenylene group or cyclohexylene group.

The "-$A^4$-$Z^3$-$(A^5)_c$-$Z^4$-$(A^6)_d$-$R^2$" will be an electron withdrawing group when each group is as follows:

$R^2$ is fluorine atom, —$OCF_2$, —$OCF_2H$, —CN, —NCS, or —$SF_5$, $A^4$, $A^5$, and $A^6$ are independently 1,4-phenylene group, 2-fluoro-1,4-phenylene group, or 2,6-difluoro-1,4-phenylene group, $Z^3$ and $Z^4$ are single bond, and c and d are independently 0 or 1.

In the conventional compound containing $CF_2O$ linkage group, there was the risk that the unstable $CF_2O$ linkage group would convert into COO when the carbon side of the $CF_2O$ is substituted with 1,4-phenylene group unless the 1,4-phenylene group is substituted with fluorine atom.

In addition, the compound containing the CF=CF linkage group suffered from the problem that cis-trans isomerization is likely to take place by ultraviolet or visible light when the CF=CF linkage group is substituted with 1,4-phenylene group.

In contrast, the compound having the CF=CF$CF_2$O linkage group of the present invention has a characteristic feature that, even if this linkage group is substituted with 1,4-phenylene group which is not substituted with fluorine atom, it is substantially free of decomposition or isomerization of the linkage group, and therefore, the compound has markedly improved stability.

This in turn means that the compound having the CF=CF$CF_2$O linkage group of the present invention has the feature that the compound can be stably produced even if the structure of the cyclic group at both ends of the linkage group is not limited to the fluorine-substituted 1,4-phenylene group or the like.

The compound (1) of the present invention is preferably compound (1-0):

  (1-0)

wherein notations in the formula are as defined above.

The compound (1-0) of the present invention is preferably the compound (1-1):

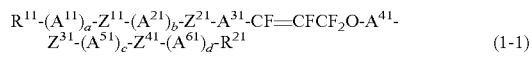  (1-1)

wherein notations in the formula are as defined above.

The compound (1-1) of the present invention is preferably the compound (1-2):

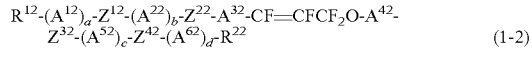  (1-2)

wherein notations in the formula are as defined above.

The method for producing the compound (1) of the present invention preferably includes the step of reacting the compound (2) with the compound (3).

In the compound (2) and compound (3), $R^1$, $R^2$, $A^1$, $A^2$, $A^3$, $A^4$, $A^5$, $A^6$, $A^7$, $Z^1$, $Z^2$, $Z^3$, $Z^4$, $Z^5$, a, b, c, d, and e and preferable embodiments thereof are as described above for the compound (1).

In compound (3), M represents a metal atom or a group containing a metal atom.

The compound (2) which is the starting material of the present invention may be prepared by the process described, for example, in WO 2004-058676.

The compound (3) can be easily obtained by using a commercially available product, by the production described in books on organic synthesis such as Shin Jikken Kagaku Koza [New Lectures on Experimental Chemistry] (Maruzen Company, Limited), or by the method described in articles such as J. Org. Chem., (2001), 66, 4333-4339 or J. Org. Chem. 2008, 73, 522-528.

It is to be noted that the compound (3) may be reacted with the compound (2) after isolation of the compound (3), or alternatively, the compound (3) may be reacted continuously with the compound (2) without isolating the compound (3).

M is a metal atom or a group containing a metal atom. M is not particularly limited as long as it undergoes addition and leaving reaction with the perfluoroallyloxy group of the compound (2), and the preferred are MgI, MgBr, MgCl, and Li.

The compound (3) is preferably used at an amount of 0.9 to 2.0 moles, and more preferably at 1 to 1.5 moles per mole of the compound (2).

The production method of the present invention is preferably conducted in a solvent. Exemplary solvents include aromatic hydrocarbon solvents such as benzene, toluene, xylene, and ethylbenzene; aliphatic hydrocarbon solvents such as pentane, hexane, heptane, and octane; ether solvents such as tetrahydrofuran, diethyl ether, diisopropyl ether, dibutyl ether, t-butylmethyl ether, and dimethoxyethane; petroleum ethers; and adequate mixtures thereof. Among these, the preferred are ether solvents such as diethylether and t-butylmethyl ether; and mixed solvent of an ether solvent and an aliphatic hydrocarbon solvent.

The solvent is preferably used at an amount of 0.1 to 100 times, and more preferably at 0.5 to 20 times more than the molar amount of the compound (2). For example, when the compound (2) is used at 1 mmol, the solvent is preferably used at 0.1 to 100 ml, and more preferably at 0.5 to 20 ml.

The reaction is preferably conducted at −70 to 50° C., and more preferably at −10 to 30° C.

The reaction is preferably conducted for a period of 0.1 to 24 hours, and more preferably 0.1 to 3 hours.

The production method of the present invention is preferably the one in which the compound (2) is the following compound (2-0):

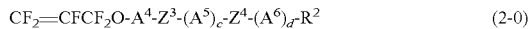
(2-0)

the compound (3) the following compound (3-0):

(3-0), and the compound (1) is the compound (1-0) as described above, wherein notations in the formula are as defined above.

The production method of the present invention is more preferably the one in which the compound (2-0) is the following compound (2-1):

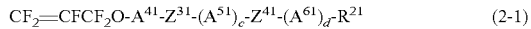
(2-1)

the compound (3-0) the following compound (3-1):

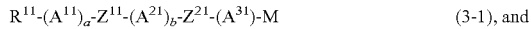
(3-1), and the compound (1-0) is the compound (1-1) as described above, wherein notations in the formula are as defined above.

The production method of the present invention is most preferably the one in which the compound (2-0) is the following compound (2-2):

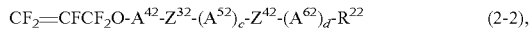
(2-2), the compound (3-0) is the following compound (3-2):

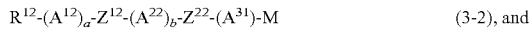
(3-2), and the compound (1-0) is the compound (1-2) as described above, wherein notations in the formula are as defined above.

The present invention also provides a liquid crystal composition containing the compound (1) as described above. This liquid crystal composition comprises a mixture of the compound (1) of the present invention with additional liquid crystal compound or non-liquid crystal compound (which is generally referred to as "additional compound").

Content of the compound (1) in the liquid crystal composition of the present invention may be adequately determined depending on the application, purpose of the use, types of other compounds, and the like. However, the compound (1) is preferably used at an amount of 0.5 to 50% by weight, and more preferably, at 2 to 20% by weight in relation to the entire amount of the liquid crystal composition. In addition, in the present invention, two or more type of the compound (1) may be included in the liquid crystal composition, and in such a case, sum of the amount of the compounds (1) is preferably in the range of 0.5 to 80% by weight, and more preferably 2 to 50% by weight in relation to the entire amount of the liquid crystal composition.

Examples of the additional compound used by mixing with the compound (1) include a component for adjusting the level of refractive anisotropy, a component for reducing viscosity, a component which shows liquid crystallinity at low temperature, a component for improving other dielectric anisotropy, a component for imparting cholesteric property, a component exhibiting dichroism, a component for imparting electroconductive property, and other additives. These may be adequately selected depending on the application, performance required, and the like. However, those generally preferred are those comprising a main component which is a liquid crystal compound or a compound having a structure similar to the liquid crystal compound and other additional components which have been added as required.

In the liquid crystal composition of the present invention, examples of the additional compound include the compounds represented by the following formulae. In the following formulae, $R^3$ and $R^4$ which may be the same or different represent groups such as alkyl group, alkenyl group, alkynyl group, alkoxy group, halogen atom, or cyano group. In addition, Cy represents trans-1,4-cyclohexylene group, Ph represents 1,4-phenylene group, and PhFF represents difluorophenylene group.

$R^3$-Cy-Cy-$R^4$
$R^3$-Cy-Ph-$R^4$
$R^3$-Cy-PhFF—CN
$R^3$-Ph-Ph-$R^4$
$R^3$-Ph-CC-Ph-$R^4$
$R^3$-Cy-COO-Ph-$R^4$
$R^3$-Cy-COO-PhFF—CN
$R^3$-Ph-COO-Ph-$R^4$
$R^3$-Ph-COO-PhFF—CN
$R^3$-Cy-CH=CH-Ph-$R^4$
$R^3$-Ph-CH=CH-Ph-$R^4$
$R^3$-Ph-CF=CF-Ph-$R^4$
$R^3$-Cy-CF=CF-Ph-$R^4$
$R^3$-Cy-CF=CF-Cy-$R^4$
$R^3$-Cy-Ph-CF=CF-Ph-$R^4$
$R^3$-Cy-Ph-CF=CF-Cy-$R^4$
$R^3$-Ph-Cy-CF=CF-Cy-$R^4$
$R^3$-Cy-Cy-CF=CF-Ph-$R^4$
$R^3$-Ph-Ph-CF=CF-Ph-$R^4$
$R^3$-Cy-CH$_2$CH$_2$-Ph-$R^4$
$R^3$-Cy-Ph-CH$_2$CH$_2$-Ph-$R^4$
$R^3$-Cy-Ph-CH$_2$CH$_2$-Cy-$R^4$
$R^3$-Cy-Cy-CH$_2$CH$_2$-Ph-$R^4$
$R^3$-Ph-CH$_2$CH$_2$-Ph-$R^4$
$R^3$-Ph-Ph-CH$_2$CH$_2$-Ph-$R^4$
$R^3$-Ph-Ph-CH$_2$CH$_2$-Cy-$R^4$
$R^3$-Cy-Ph-Ph-$R^4$
$R^3$-Cy-Ph-PhFF—CN
$R^3$-Cy-Ph-C≡C-Ph-$R^4$
$R^3$-Cy-Ph-C≡C-PhFF—CN
$R^3$-Cy-Ph-C≡C-Ph-Cy-$R^4$
$R^3$-Cy-CH$_2$CH$_2$-Ph-C≡C-Ph-$R^4$
$R^3$-Cy-CH$_2$CH$_2$-Ph-C≡C-Ph-Cy-$R^4$
$R^3$-Cy-Ph-Ph-Cy-$R^4$
$R^3$-Ph-Ph-Ph-$R^4$
$R^3$-Ph-Ph-CC-Ph-$R^4$
$R^3$-Ph-CH$_2$CH$_2$-Ph-C≡C-Ph-$R^4$
$R^3$-Ph-CH$_2$CH$_2$-Ph-C≡C-Ph-Cy-$R^4$
$R^3$-Cy-COO-Ph-Ph-$R^4$
$R^3$-Cy-COO-Ph-PhFF—CN
$R^3$-Cy-Ph-COO-Ph-$R^4$
$R^3$-Cy-Ph-COO-PhFF—CN
$R^3$-Cy-COO-Ph-COO-Ph-R
$R^3$-Cy-COO-Ph-COO-PhFF—CN
$R^3$-Ph-COO-Ph-COO-Ph-$R^4$
$R^3$-Ph-COO-Ph-OCO-Ph-$R^4$
$R^3$-Ph-CF$_2$O-Ph-$R^4$
$R^3$-Cy-CF$_2$O-Ph-$R^4$
$R^3$-Ph-CF$_2$O-Cy-$R^4$
$R^3$-Cy-Ph-CF$_2$O-Ph-$R^4$
$R^3$-Cy-Ph-CF$_2$O-Cy-$R^4$
$R^3$-Cy-Cy-CF$_2$O-Ph-$R^4$
$R^3$-Ph-Ph-CF$_2$O-Ph-$R^4$
$R^3$-Ph-Ph-CF$_2$O-Cy-$R^4$
$R^3$-Cy-Ph-CF$_2$O-PhFF—$R^4$
$R^3$-Cy-PhFF—CF$_2$O-PhFF—$R^4$
$R^3$-Ph-Ph-CF$_2$O-PhFF—$R^4$
$R^3$-Ph-PhFF—CF$_2$O-PhFF—$R^4$
$R^3$-Ph-CF$_2$CF$_2$-Ph-$R^4$
$R^3$-Cy-CF$_2$CF$_2$-Ph-$R^4$
$R^3$-Cy-CF$_2$CF$_2$-Cy-$R^4$
$R^3$-Cy-Ph-CF$_2$CF$_2$-Ph-$R^4$
$R^3$-Cy-Ph-CF$_2$CF$_2$-Cy-$R^4$

R³-Cy-Cy-CF₂CF₂-Ph-R⁴
R³-Ph-Ph-CF₂CF₂-Ph-R⁴
R³-Ph-Ph-CF₂CF₂-Cy-R⁴

The compounds as mentioned above are merely typical examples, other examples include these compounds having the hydrogen atom in its ring structure or in its terminal group substituted with a halogen atom, cyano group, methyl group, or the like. Other examples include those wherein the cyclohexane ring or the benzene ring is substituted with other six membered ring or five membered ring, for example, pyrimidine ring or dioxane ring; and those wherein the linkage groups between the rings are independently replaced with other divalent linkage bonds, for example, —CH₂O—, —CH=CH—, —N=N—, —CH=N—, —COOCH₂—, —OCOCH₂—, or —COCH₂—. These compounds may also be selected depending on the desired performance.

The present invention also provides a liquid crystal electrooptical element prepared by using the liquid crystal composition as described above as its constitutional material. For example, the present invention provides a liquid crystal electrooptical element having an electrooptical element section prepared by sandwiching the liquid crystal phase formed, for example, by introducing the liquid crystal composition of the present invention in a liquid crystal cell between two substrates each equipped with an electrode. Exemplary liquid crystal electrooptical elements include those driven by various modes including twisted nematic mode, guest-host mode, dynamic scattering mode, phase change mode, DAP mode, dual frequency driven mode, and ferroelectric liquid crystal display mode.

A typical liquid crystal electrooptical element is twisted nematic (TN) liquid crystal display element. In producing the twisted nematic (TN) liquid crystal element, a substrate of plastic, glass, or other material is overlaid with an undercoat layer of SiO₂, Al₂O₃, or the like or a color filter layer, and a coating comprising In₂O₃—SnO₂ (ITO), SnO₂, or the like is formed. An electrode of the required pattern is then formed by photolithography or the like, and after forming an optional overcoat layer of polyimide, polyamide, SiO₂, Al₂O₃, or the like, orientation treatment is conducted, and a sealing material is then printed. After arranging the substrates so that the electrode surface oppose to each other, the periphery is sealed and the sealing material is cured to produce an empty cell.

To this empty cell, the composition of the present invention is introduced, and the inlet is closed by a sealant to constitute the liquid crystal cell. This liquid crystal cell is then overlaid as desired with a polarizing plate, a color polarizing plate, a light source, a color filter, a semi-transparent reflective plate, a reflective plate, a light guide plate, a UV cut filter, or the like, and after printing necessary characters or figures, and the like, non-glare treatment or other necessary treatment is conducted to thereby produce the liquid crystal electrooptical element.

It is to be noted that the above description is the basic constitution and method for producing a liquid crystal electrooptical element, and various other constitution is also acceptable. Exemplary such other constitutions include a substrate prepared by using a dual-layer electrode, a dual layer liquid crystal cell having two liquid crystal layers, a substrate prepared by using a reflective electrode, and an active matrix element using an active matrix substrate formed with a TFT, MIM, or other active element.

In addition, the composition of the present invention may also be used in a mode other than the TN liquid crystal electrooptical element as described above, and exemplary such other modes include super-twisted nematic (STN) liquid crystal electrooptical element using a greater twist angle; guest-host (GH) liquid crystal electrooptical element using a multichroic dye; in plane switching (IPS) liquid crystal electrooptical element wherein the liquid crystal molecules are driven in parallel direction to the substrate by applying transverse electric field; VA liquid crystal electrooptical element wherein the liquid crystal molecules are oriented in vertical direction to the substrate; and ferroelectric liquid crystal electrooptical element. The composition of the present invention may also be used in a mode to be written by heat and not by electricity.

EXAMPLES

Next, the present invention is described in further detail by referring to the Examples which by no means limit the scope of the present invention.

Reference Example 1

Synthesis Compound (2A)

Chemical Formula 1

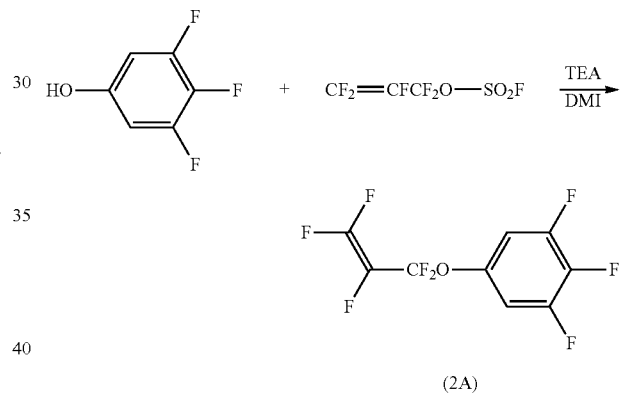

(2A)

To a mixed solution of N,N-dimethylimidazolidinone (140 g), trifluorophenol (20 g), and triethylamine (93.6 g), perfluoroallyl fluorosulfate (5.6 g) was added dropwise at a temperature of up to 10° C. After stirring at a temperature of up to 10° C. for 2 hours, ethyl acetate (30 g) was added, and the mixture was washed with water (50 g). After removing the solvent by distillation, the residue was purified by silica gel column chromatography to produce a compound (2A) (2.5 g).

Example 1

Synthesis Compound (1A)

Chemical Formula 2

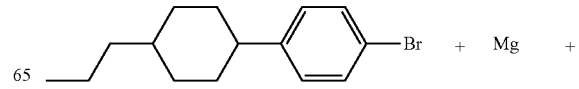

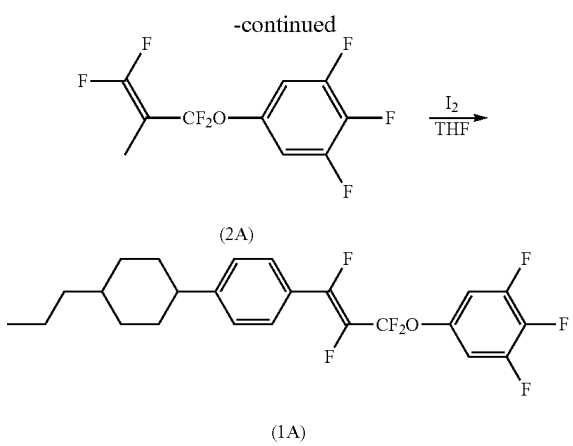

(2A)

(1A)

Tetrahydrofuran (THF) (5 ml) and iodine (1 particle) were added to magnesium (286 mg), and the mixture was fully stirred. To this mixture, a solution of 4-n-propyl(4-cyclohexyl)bromobenzene (2.71 g) in THF (5.42 ml) was added dropwise at room temperature. After stirring at 30 to 40° C. for 4 hours, the reaction solution was cooled to a temperature of up to 10° C., and to this solution, a solution of compound (2A) (2.0 g) in THF (2 ml) was added dropwise. The solution was stirred at room temperature, and after 15 hours, hexane (30 ml) was added, and the mixture was washed with 1N aqueous hydrochloric acid solution, aqueous solution of sodium bicarbonate, and water in this order. The solvent was removed by distillation, and the residue was purified by silica gel column chromatography and recrystallization to obtain compound (1A) (0.68 g).

$^{19}$F-NMR and GC-MS data of the resulting compound (1A) are as shown below.

$^{19}$F-NMR (282.6 MHz, solvent: CDCl$_3$, standard: CFCl$_3$) δ (ppm): −70.5 (dd, 2F), −132.6 (m, 2F), −146.5 (dt, 1F), −163.3 (m, 1F), −167.6 (dt, 1F)

GC-MS M$^+$=460

Compound (1A) had a clearing temperature (Tc) of 68.8° C. and a refractive anisotropy (Δn) of 0.116 when determined by extrapolation from liquid crystal composition ZLI-1565 manufactured by Merck & Co., Inc.

Reference Example 2

Synthesis and purification was conducted by repeating the procedure of Reference Example 1 except that the trifluorophenol was replaced with difluorophenol (17.6 g). Compound (2B) (27.3 g) was thereby obtained.

[Chemical Formula 3]

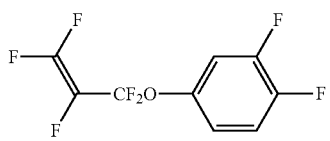

(2B)

Example 2

Synthesis and purification was conducted by repeating the procedure of Example 1 except that compound (2A) of Example 1 was replaced with compound (2B) (1.87 g) obtained in Reference Example 2. Compound (1B) (0.47 g) was thereby obtained.

$^{19}$F-NMR and GC-MS data of the resulting compound (2A) are as shown below.

$^{19}$F-NMR (282.6 MHz, solvent: CDCl$_3$, standard: CFCl$_3$) δ (ppm): −70.2 (dd, 2F), −134.5 (m, 1F), −140.6 (m, 1F), −146.8 (dt, 1F), −167.2 (dt, 1F)

GC-MS M$^+$=442

Tc and Δn were determined by repeating the procedure of Example 1. Compound (1B) had a Tc of 82.8° C., and a Δn of 0.135.

Chemical Formula 4

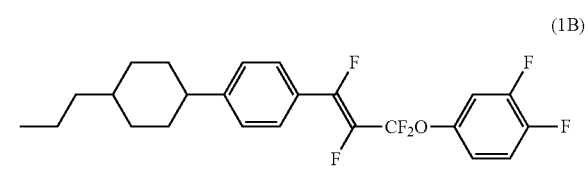

(1B)

Example 3

Synthesis Compound (1C)

Chemical Formula 5

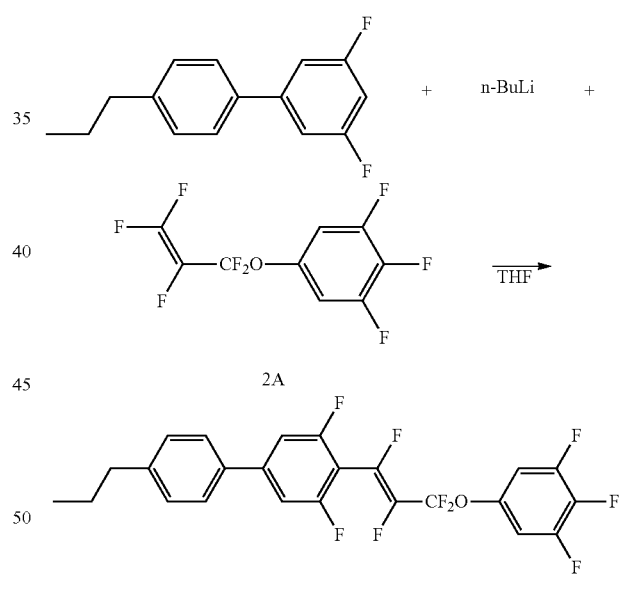

Tetrahydrofuran (THF) (400 ml) was added to 4-n-propyl-3'-5'-difluorobiphenyl (50.1 g), and the mixture was fully stirred. The solution was cooled to −78° C., and a solution of n-butyl lithium in n-hexane (1.6 mol/L) (135 ml) was added dropwise. The solution was stirred at −78° C., and after 1 hour, the compound (2A) (50.0 g) was added dropwise, and stirred at −78° C. After 2 hours, the mixture was washed with 1N aqueous hydrochloric acid solution, aqueous solution of sodium bicarbonate, and water in this order. The solvent was removed by distillation, and the residue was purified by silica gel column chromatography and recrystallization to obtain compound (1C) (7.24 g).

$^{19}$F-NMR and GC-MS data of the resulting compound (1C) are as shown below.

$^{19}$F-NMR (282.6 MHz, solvent: CDCl$_3$, standard: CFCl$_3$) δ (ppm): −71.3 (dd, 2F), −109.0 (dd, 2F), −132.4 (m, 2F), −135.6 (m, 1F), −159.3 (m, 1F), −162.8 (m, 1F)

GC-MS M$^+$=490

Compound (1C) had a clearing temperature (Tc) of −3.9° C. and a refractive anisotropy (Δn) of 0.136 when determined by extrapolation from liquid crystal composition ZLI-1565 manufactured by Merck & Co., Inc.

Reference Example 3

Synthesis and purification was conducted by repeating the procedure of Reference Example 1 except that the trifluorophenol was replaced with monofluorophenol (50.0 g). Compound (2C) (87.9 g) was thereby obtained.

[Chemical Formula 6]

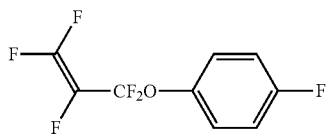

(2C)

Example 4

Synthesis Compound (1D)

Chemical Formula 7

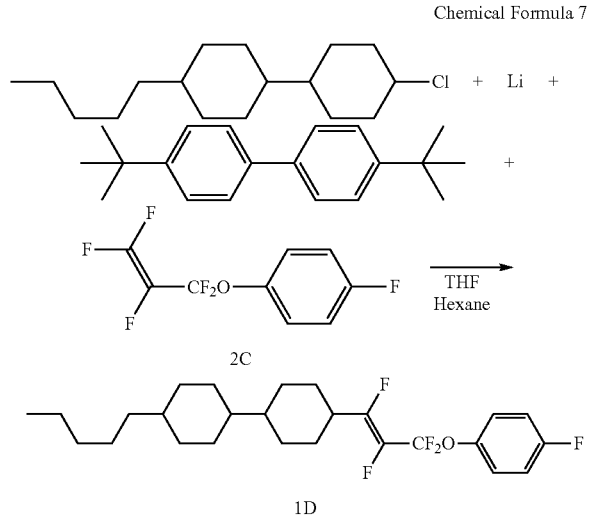

Tetrahydrofuran (THF) (450 ml) was added to lithium (3.87 g) and 4,4'-di-tertiary butyl biphenyl (123.6 g), and the mixture was stirred at 15° C. for 1 hour. Next, hexane (450 ml) was added dropwise, and the mixture was stirred at 15° C. for 2 hours. The reaction mixture was cooled to −65° C., and a solution of 4-(4'-n-pentyl cyclohexyl)chlorocyclohexane (93.48 g) in THF (120 ml) was added dropwise to this solution, and the mixture was stirred at −65° C. for 1 hour. Next, a solution of the compound (2C) (42.2 g) in THF (60 ml) was added dropwise, and after stirring the solution overnight, the mixture was washed with 1N aqueous hydrochloric acid solution, aqueous solution of sodium bicarbonate, and water in this order. The solvent was removed by distillation, and the residue was purified by silica gel column chromatography and recrystallization to obtain compound (10) (4.42 g).

$^{19}$F-NMR and GC-MS data of the resulting compound (10) are as shown below.

$^{19}$F-NMR (282.6 MHz, solvent: CDCl$_3$, standard: CFCl$_3$) δ (ppm): −70.7 (dd, 2F), −116.8 (d, 1F), −149.7 (dq, 1F), −172.7 (m, 1F)

GC-MS M$^+$=458

Compound (1D) had a clearing temperature (Tc) of 93.0° C. and a refractive anisotropy (Δn) of 0.061 when determined by extrapolation from liquid crystal composition ZLI-1565 manufactured by Merck & Co., Inc.

Reference Example 4

Synthesis and purification was conducted by repeating the procedure of Reference Example 1 except that the trifluorophenol was replaced with 2,3-difluoro-4-methoxyphenol (160.1 g). Compound (2D) (87.0 g) was thereby obtained.

Chemical Formula 2D

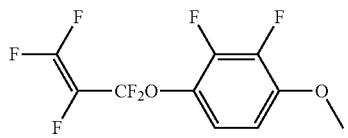

(2D)

Example 5

Synthesis Compound (1E)

The procedure of Example 1 was repeated except that the p-(n-propyl-4-cyclohexyl)bromobenzene was replaced with p-n-propyl bromobenzene (17.2 g) to obtain compound (1E) (16.7 g).

$^{19}$F-NMR and GC-MS data of the resulting compound (1E) are as shown below.

$^{19}$F-NMR (282.6 MHz, solvent: CDCl$_3$, standard: CFCl$_3$) δ (ppm): −70.6 (dd, 2F), −132.6 (m, 2F), −146.5 (dt, 1F), −163.3 (m, 1F), −167.6 (m, 1F)

GC-MS M$^+$=378

Compound (1E) had a clearing temperature (Tc) of −67.8° C. and a refractive anisotropy (Δn) of 0.075 when determined by extrapolation from liquid crystal composition ZLI-1565 manufactured by Merck & Co., Inc.

Chemical Formula 8

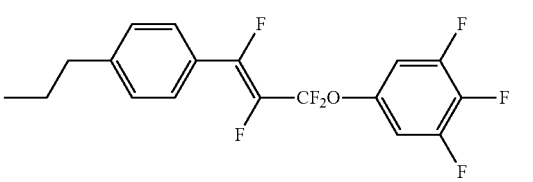

1E

Reference Example 5

Synthesis and purification was conducted by repeating the procedure of Reference Example 1 except that the trifluorophenol was replaced with p-n-propylphenol (50.0 g). Compound (2E) (76.4 g) was thereby obtained.

Chemical Formula 2E

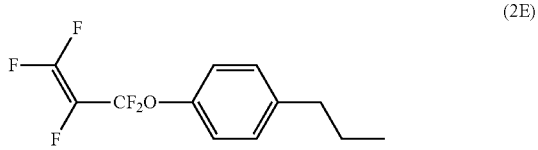

(2E)

Example 6

Synthesis Compound (1F)

The procedure of Example 1 was repeated except that the p-(n-propyl-4-cyclohexyl)bromobenzene was replaced with 4-n-propyl-4'-bromobiphenyl (11.9 g) to obtain compound (1F) (5.00 g).

$^{19}$F-NMR and GC-MS data of the resulting compound (1F) are as shown below.

$^{19}$F-NMR (282.6 MHz, solvent: CDCl$_3$, standard: CFCl$_3$) δ (ppm): −70.6 (dd, 2F), −132.6 (m, 2F), −147.0 (dt, 1F), −163.2 (m, 1F), −166.5 (m, 1F)

GC-MS M$^+$=454

Compound (1F) had a clearing temperature (Tc) of 85.7° C. and a refractive anisotropy (Δn) of 0.1989 when determined by extrapolation from liquid crystal composition ZLI-1565 manufactured by Merck & Co., Inc.

[Chemical Formula 9]

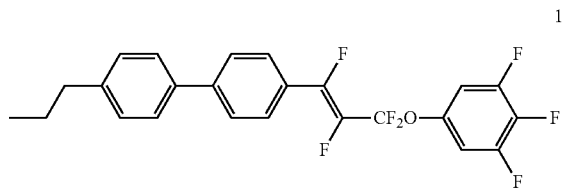

1F

Example 7

Synthesis of Compound (1G)

The procedure of Example 1 was repeated except that the p-(n-propyl-4-cyclohexyl)bromobenzene was replaced with 4-(4-n-propylcyclohexyl)-4'-bromobiphenyl (15.4 g) to obtain compound (1G) (5.00 g).

$^{19}$F-NMR and GC-MS data of the resulting compound (1G) are as shown below.

$^{19}$F-NMR (282.6 MHz, solvent: CDCl$_3$, standard: CFCl$_3$) δ (ppm): −70.5 (dd, 2F), −132.6 (m, 2F), −147.0 (dt, 1F), −163.2 (m, 1F), −166.6 (m, 1F)

GC-MS M$^+$=536

Compound (1G) had a clearing temperature (Tc) of 192.1° C. and a refractive anisotropy (Δn) of 0.2209 when determined by extrapolation from liquid crystal composition ZLI-1565 manufactured by Merck & Co., Inc.

Chemical Formula 10

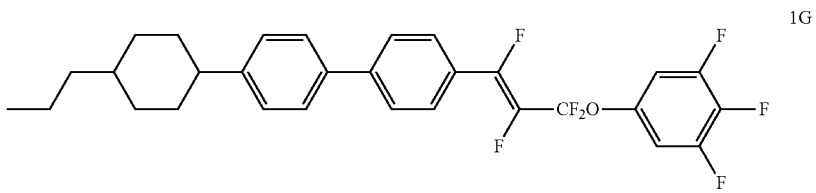

1G

Example 8

Synthesis Compound (1H)

Chemical Formula 11

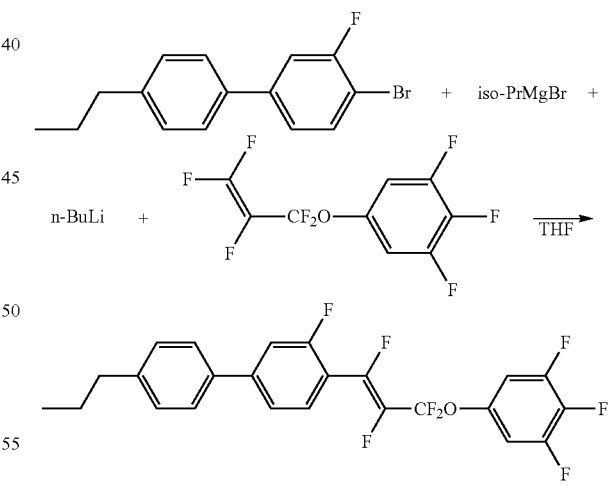

A solution (86 ml) of isopropyl magnesium bromide (1.0 mol/L) in THF was added to THF (450 ml) which had been cooled to −78° C., and the mixture was thoroughly stirred. A solution (105 ml) of n-butyl lithium (1.6 mol/L) in n-hexane was added dropwise to this solution, and the mixture was stirred at −78° C. After 1 hour, a solution (45 ml) of 4-n-propyl-3'-fluoro-4'-bromobiphenyl (25.3 g) in THF was added, and the mixture was stirred at −78° C. After 2 hours, compound (2A) (30.0 g) was added dropwise, and the mixture was stirred at −78° C. After 2 hours, the mixture was washed with 1N aqueous hydrochloric acid solution, aqueous solution of sodium bicarbonate, and water in this order. The solvent was removed by distillation, and the residue was purified by silica gel column chromatography and recrystallization to obtain compound (1H) (3.54 g).

$^{19}$F-NMR and GC-MS data of the resulting compound (1H) are as shown below.

$^{19}$F-NMR (282.6 MHz, solvent: CDCl$_3$, standard: CFCl$_3$) δ (ppm): −71.1 (dd, 2F), −110.2 (m, 1F), −132.5 (m, 2F), −136.7 (m, 1F), −162.7 (m, 1F), −163.1 (m, 1F)

GC-MS M$^+$=472

Compound (1H) had a clearing temperature (Tc) of 32.6° C. and a refractive anisotropy (Δn) of 0.171 when determined by extrapolation from liquid crystal composition ZLI-1565 manufactured by Merck & Co., Inc.

Example 9

Synthesis Compound (1I)

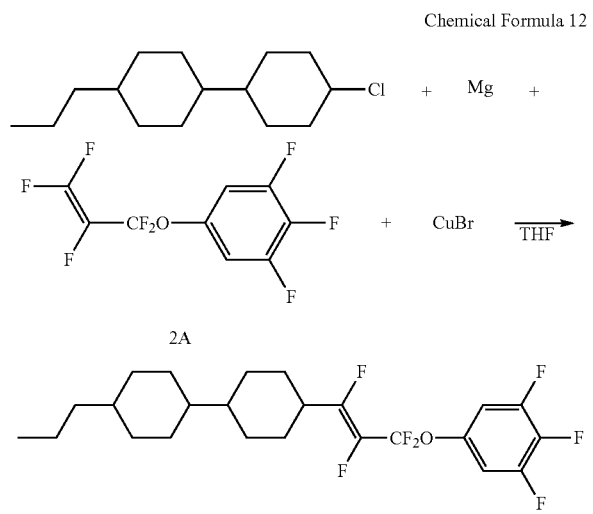

Chemical Formula 12

1I

THF (1 ml) and iodine (1 particle) were added to magnesium (1.30 g), and the mixture was thoroughly stirred. Next, bromoethane (0.90 g) was added dropwise at 40° C., and the mixture was stirred. After 1 hour, a solution of 4-n-propyl(4-cyclohexyl)chlorocyclohexane (10.0 g) in THF (10.0 ml) was added dropwise at 40° C., and the mixture was stirred at 30 to 40° C. for 3 hours. Compound (2A) (11.5 g), THF (20 ml), and cuprous bromide (1.2 g) were added to another reaction vessel, and the mixture was cooled to −20° C., and to this mixture, the solution as described above was added dropwise at −20° C., and the mixture was stirred at room temperature. After 3 hours, the mixture was washed with 1N aqueous hydrochloric acid solution, aqueous solution of sodium bicarbonate, and water in this order. The solvent was removed by distillation, and the residue was purified by silica gel column chromatography and recrystallization to obtain compound (1I) (0.95 g).

$^{19}$F-NMR and GC-MS data of the resulting compound (1I) are as shown below.

$^{19}$F-NMR (282.6 MHz, solvent: CDCl$_3$, standard: CFCl$_3$) δ (ppm): −71.4 (dd, 2F), −132.8 (m, 2F), −148.6 (m, 1F), −163.4 (m, 1F), −173.3 (dt, 1F)

GC-MS M$^+$=466

Compound (1A) had a clearing temperature (Tc) of 58.3° C. and a refractive anisotropy (Δn) of 0.0912 when determined by extrapolation from liquid crystal composition ZLI-1565 manufactured by Merck & Co., Inc.

Example 10

Synthesis and purification was conducted by repeating the procedure of Example 1 except that the compound (2A) was replaced with the compound (2D) (10.0 g) obtained by Reference Example 4. Compound (1J) (7.80 g) was thereby obtained.

19F-NMR and GC-MS data of the resulting compound (1J) are shown below.

19F-NMR (282.6 MHz, solvent: CDCl3, standard: CFCl3) ■ (ppm): −70.9 (m, 2F), −146.5 (dt, 1F), −149.9 (t, 1F), −156.4 (m, 1F), −167.6 (dt, 1F)

GC-MS M$^+$=472

Compound (1J) had a clearing temperature (Tc) of 126.5° C. and a refractive anisotropy (■n) of 0.162 when determined by extrapolation from liquid crystal composition ZLI-4792 manufactured by Merck & Co., Inc.

Chemical Formula 1J

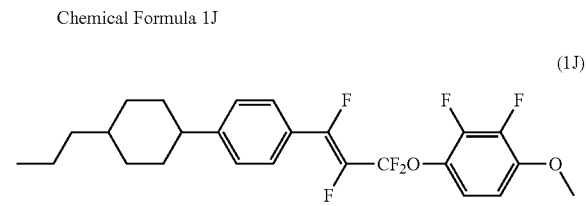

(1J)

Example 11

Synthesis and purification was conducted by repeating the procedure of Example 10 except that p-(4-n-propyl cyclohexyl)bromobenzene was replaced with 4-(4-n-propyl cyclohexyl)cyclohexyl bromobenzene (10.0 g). Compound (1K) (7.05 g) was thereby obtained.

19F-NMR and GC-MS data of the resulting compound (1K) are shown below.

19F-NMR (282.6 MHz, solvent: CDCl3, standard: CFCl3) ■ (ppm): −70.9 (m, 2F), −146.6 (dt, 1F), −149.9 (t, 1F), −156.4 (m, 1F), −167.6 (dt, 1F)

GC-MS M$^+$=554

Compound (1K) had a clearing temperature (Tc) of 248.1° C. and a refractive anisotropy (■n) of 0.183 when determined by extrapolation from liquid crystal composition ZLI-4792 manufactured by Merck & Co., Inc.

Chemical Formula 1K

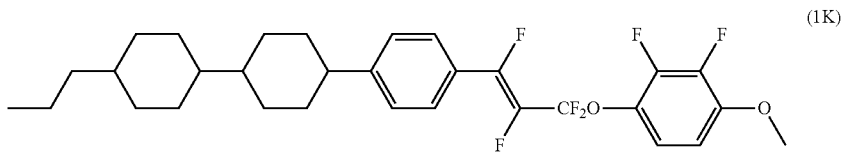

Example 12

Synthesis Compound (1L)

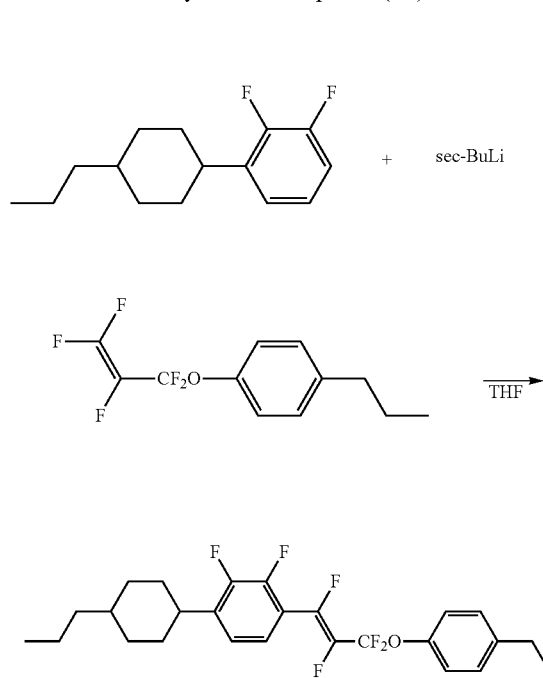

To (4-n-propylcyclohexyl)-2,3-difluorobenzene (11.7 g), tetrahydrofuran (THF) (64 ml) was added and fully stirred. The mixture was cooled to −78° C., and to this mixture, a solution of n-hexane/cyclohexane (49 ml) containing sec-butyllithium (1.0 mol/L) was added dropwise and stirred at −78° C. One hour later, the compound (2E) (13.8 g) was added dropwise to the mixture and stirred at −78° C. Two hours later, the mixture was washed with 1N aqueous hydrochloric acid solution, aqueous solution of sodium bicarbonate, and water in this order, and then the solvent was removed from the mixture. The residue was purified by silica gel column chromatography and recrystallization to obtain compound (1L) (1.9 g).

19F-NMR and GC-MS data of the resulting compound (1L) are shown below.

19F-NMR (282.6 MHz, solvent: CDCl3, standard: CFCl3) ■ (ppm): −70.0 (m, 2F), −135.5 (m, 1F), −138.0 (m, 1F), −143.2 (t, 1F), −161.6 (m, 1F)

GC-MS M+=484

Compound (1L) had a clearing temperature (Tc) of 65.3° C. and a refractive anisotropy (■n) of 0.136 when determined by extrapolation from liquid crystal composition ZLI-4792 manufactured by Merck & Co., Inc.

Chemical Formula 1L

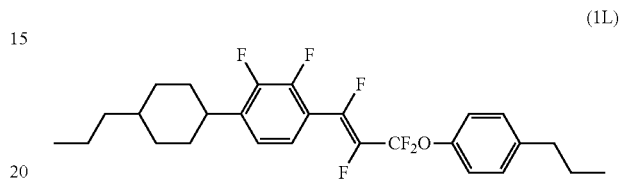

The following compounds may also be produced based on the description of Examples 1 to 12 and the other aspects of the description above.

Examples of the two ring compound (those wherein all of a to e are 0) include:
$C_3H_7$-Ph-CF=CFCF$_2$O-Ph-$C_2H_5$
$C_3H_7$-Ph-CF=CFCF$_2$O-Ph-F
$C_3H_7$-Ph-CF=CFCF$_2$O-Ph(2F)—F
$C_3H_7$-Ph-CF=CFCF$_2$O-Ph(2F,6F)—F
$C_3H_7$-Ph-CF=CFCF$_2$O-Ph(2F,6F)—CN
$C_3H_7$-Ph-CF=CFCF$_2$O-Ph(2F,6F)—NCS
$C_3H_7$-Ph-CF=CFCF$_2$O-Ph(2F,6F)—SF$_5$
$C_3H_7$-Ph-CF=CFCF$_2$O-Ph(2F)—OCF$_3$
$C_3H_7$O-Ph-CF=CFCF$_2$O-Ph(2F)—OCF$_3$
$C_2H_5$-Ph-CF=CFCF$_2$O-Ph(2F,3F)—OCH$_3$
$C_5H_{11}$-Ph-CF=CFCF$_2$O-Ph(2F,6F)—OCF$_2$H
$CH_3CH$=CH—$C_2H_4$-Ph-CF=CFCF$_2$O-Ph(2F,6F)—F
$CH_3OCH_2$-Ph-CF=CFCF$_2$O-Ph(2F,3F)—F
$C_3H_7$O-Ph(2F,3F)—CF=CFCF$_2$O-Ph(2F,3F)—F
$C_3H_7$-Cy-CF=CFCF$_2$O-Ph-$C_2H_5$
$C_3H_7$-Cy-CF=CFCF$_2$O-Ph(2F,6F)—F
$C_3H_7$-Cy-CF=CFCF$_2$O-Ph(2F,6F)—CN
$C_3H_7$O-Cy-CF=CFCF$_2$O-Ph(2F)—OCF$_3$
$C_2H_5$-Cy-CF=CFCF$_2$O-Ph(2F,3F)—OCH$_3$
$CH_3CH$=CH—$C_2H_4$-Cy-CF=CFCF$_2$O-Ph(2F,6F)—F
$CH_2$=CH-Cy-CF=CFCF$_2$O-Ph (F,F)—F
$C_5H_{11}$-Cy-CF=CFCF$_2$O-Ph(2F,6F)—OCF$_2$H.

Examples of the three ring compound (those wherein 1 of a to e is 1 and other 4 are 0) include:
$C_3H_7$-Cy-Ph-CF=CFCF$_2$O-Ph-$C_2H_5$
$C_3H_7$-Cy-Ph-CF=CFCF$_2$O-Ph-F
$C_3H_7$-Cy-Ph-CF=CFCF$_2$O-Ph(2F)—F
$C_3H_7$-Cy-Ph-CF=CFCF$_2$O-Ph(2F,6F)—F
$C_3H_7$-Cy-Ph-CF=CFCF$_2$O-Ph(2F,6F)—CN
$C_2H_5$-Cy-Ph-CF=CFCF$_2$O-Ph(2F,6F)—NCS
$C_3H_7$-Cy-Ph-CF=CFCF$_2$O-Ph(2F,6F)—SF$_5$
$C_5H_{11}$-Cy-Ph-CF=CFCF$_2$O-Ph(2F,6F)—OCF$_3$
$C_3H_7$-Cy-Ph-CF=CFCF$_2$O-Ph(2F,3F)—OC$_2$H$_5$
$C_2H_5$-Cy-Ph(2F,3F)—CF=CFCF$_2$O-Ph(2F,3F)—OC$_2$H$_5$
$C_3H_7$-Cy-Ph(2F)—CF=CFCF$_2$O-Ph(2F,6F)—F
$C_3H_7$-Cy-Ph(2F,6F)—CF=CFCF$_2$O-Ph(2F,6F)—F
$C_3H_7$-Cy-Ph(2F,6F)—CF=CFCF$_2$O-Ph(2F,6F)—OCF$_3$
$C_3H_7$-Cy-Ph(2F,6F)—CF=CFCF$_2$O-Ph(2F,6F)—CN
$C_2H_5$-Ph-Ph-CF=CFCF$_2$O-Ph-F
$C_3H_7$-Ph-Ph-CF=CFCF$_2$O-Ph(2F)—F C₃H₇-Ph-Ph-CF=CFCF₂O-Ph(2F,6F)—F
C₅H₁₁-Ph-Ph-CF=CFCF₂O-Ph(2F,6F)—CN
C₃H₇-Ph-Ph-CF=CFCF₂O-Ph(2F,6F)—NCS
C₃H₇-Ph-Ph-CF=CFCF₂O-Ph(2F,6F)—SF₅
C₃H₇-Ph-Ph-CF=CFCF₂O-Ph(2F,6F)—OCF₃
C₂H₅-Ph-Ph-CF=CFCF₂O-Ph(2F,3F)—OC₂H₅
C₃H₇-Ph-Ph(2F,3F)—CF=CFCF₂O-Ph(2F,3F)—OC₂H₅
C₃H₇-Ph-Ph(2F)—CF=CFCF₂O-Ph(2F,6F)—F
C₅H₁₁-Ph-Ph(2F,6F)—CF=CFCF₂O-Ph(2F,6F)—F
C₃H₇-Cy-Cy-CF=CFCF₂O-Ph-F
CH₂=CH-Cy-Cy-CF=CFCF₂O-Ph(2F)—F
C₃H₇-Cy-Cy-CF=CFCF₂O-Ph(2F)—OCF₃
C₃H₇-Cy-Cy-CF=CFCF₂O-Ph(2F,6F)—F
C₃H₇-Cy-Cy-CF=CFCF₂O-Ph(2F,6F)—CN
C₅H₁₁-Cy-Cy-CF=CFCF₂O-Ph(2F,3F)—OC₂H₅
C₅H₁₁-Cy-Cy-CF=CFCF₂O-Ph(2F,6F)—OCF₂H
C₂H₅-Ph-CF=CFCF₂O-Ph-Ph(2F)—F
C₃H₇-Ph-CF=CFCF₂O-Ph-Ph(2F,6F)—F
C₃H₇-Ph-CF=CFCF₂O-Ph(2F,6F)-Ph(2F,6F)—F
C₅H₁₁-Ph-CF=CFCF₂O-Ph(2F,6F)-Ph(2F,6F)—CN
CH₃CH=CHC₂H₄-Ph-CF=CFCF₂O-Ph-Ph(2F)—F
C₃H₇-Ph-CF=CFCF₂O-Ph(2F,3F)—OCH₃
C₃H₇-Ph(2F)—CF=CFCF₂O-Ph(2F,6F)—F
C₂H₅-Ph-CF=CFCF₂O-Ph-Cy-C₅H₁₁
C₂H₅-Ph-CF=CFCF₂O-Ph(2F)-Cy-C₅H₁₁
C₃H₇-Ph-CF=CFCF₂O-Ph(2F,6F)-Cy-C₅H₁₁
C₃H₇-Ph(2F,3F)—CF=CFCF₂O-Ph-Cy-OC₂H₅
C₂H₅-Cy-CF=CFCF₂O-Ph-Ph(2F)—F
C₅H₁₁-Cy-CF=CFCF₂O-Ph(2F,6F)—F
C₃H₇-Cy-CF=CFCF₂O-Ph(2F,6F)-Ph(2F)—OCF₃
C₃H₇-Cy-CF=CFCF₂O-Ph(2F,6F)-Ph(2F,6F)—F
C₅H₁₁-Cy-CF=CFCF₂O-Ph(2F,6F)-Ph(2F,6F)—CN
C₃H₇-Cy-CF=CFCF₂O-Ph(2F,3F)—OC₂H₅
C₃H₇-Cy-C₂H₄-Ph-CF=CFCF₂O-Ph(2F)—F
C₃H₇-Cy-C₂H₄-Ph(2F)—CF=CFCF₂O-Ph(2F,6F)—F
C₃H₇-Cy-C₂H₄-Ph(2F)—CF=CFCF₂O-Ph(2F,6F)—OCF₃
CH₃CH=CHC₂H₄-Cy-C₂H₄-Ph-CF=CFCF₂O-Ph(2F)—C₃H₇
CH₂=CH-Cy-CH₂O-Ph-CF=CFCF₂O-Ph(2F)—F
C₃H₇-Cy-CH₂O-Ph(2F,3F)—CF=CFCF₂O-Ph(2F,3F)—OC₂H₅.

Examples of the four ring compounds (those wherein 2 of a to e are 1 and other 3 are 0) include:
C₃H₇-Ph-CF=CFCF₂O-Ph-Ph-Ph-C₂H₅
C₃H₇-Ph-CF=CFCF₂O-Ph-Ph-Ph(2F,6F)—F
C₂H₅-Ph-CF=CFCF₂O-Ph-Ph(2F,6F)-Ph(2F)—F
C₅H₁₁-Ph-CF=CFCF₂O-Ph(2F)-Ph(2F)-Ph(2F)—CN
C₅H₁₁-Ph-CF=CFCF₂O-Ph(2F)-Ph(2F,6F)-Ph(2F)—OCF₃
C₃H₇-Ph-CF=CFCF₂O-Ph(2F,6F)-Ph(2F,6F)-Ph(2F,6F)—F
C₂H₅-Ph(2F)—CF=CFCF₂O-Ph-Ph(2F,6F)-Ph(2F)—CN
C₂H₅-Ph(2F,3F)—CF=CFCF₂O-Ph-Ph-Ph(2F)—F
C₃H₇-Cy-CF=CFCF₂O-Ph-Ph-Ph-C₂H₅
C₃H₇-Cy-CF=CFCF₂O-Ph-Ph-Ph(2F,6F)—F
C₂H₅-Cy-CF=CFCF₂O-Ph-Ph(2F,3F)-Ph(2F,3F)—OC₂H₅
C₅H₁₁-Cy-CF=CFCF₂O-Ph(2F)-Ph(2F)-Ph(2F)—CN
C₅H₁₁-Cy-CF=CFCF₂O-Ph(2F)-Ph(2F,6F)-Ph(2F)—OCF₃
C₃H₇-Cy-CF=CFCF₂O-Ph(2F,6F)-Ph(2F,6F)-Ph(2F,6F)—F
C₂H₅-Cy-CF=CFCF₂O-Ph(2F,6F)-Ph(2F,6F)-Ph(2F)—CN
C₃H₇-Ph-CF=CFCF₂O-Ph(2F,3F)-Ph(2F,3F)-Cy-C₂H₅
C₃H₇-Ph-CF=CFCF₂O-Ph(2F,6F)-Ph(2F,6F)-Cy-CH=CH₂
C₃H₇-Ph(2F,3F)—CF=CFCF₂O-Ph(2F,3F)-Ph(2F,3F)-Cy-CH₃
C₃H₇-Ph-CF=CFCF₂O-Ph(2F,3F)-Cy-Cy-C₂H₅
C₃H₇-Ph-CF=CFCF₂O-Ph(2F,6F)-Cy-Cy-OCH₃
C₃H₇-Cy-Ph-CF=CFCF₂O-Ph-Ph-C₂H₅
C₃H₇-Cy-Ph-CF=CFCF₂O-Ph(2F)-Ph(2F,6F)—F
C₅H₁₁-Cy-Ph-CF=CFCF₂O-Ph(2F,6F)-Ph(2F,6F)—OCF₃
C₃H₇-Cy-Ph-CF=CFCF₂O-Ph-Cy-CH=CH₂
C₅H₁₁-Cy-Ph-CF=CFCF₂O-Ph(2F,3F)-Cy-C₂H₅
C₃H₇-Cy-Ph(2F,3F)—CF=CFCF₂O-Ph(2F,3F)-Cy-C₂H₅
C₃H₇-Cy-Cy-CF=CFCF₂O-Ph-Ph(2F)—F
C₅H₁₁-Cy-Cy-CF=CFCF₂O-Ph(2F)-Ph(2F,6F)—CN
C₅H₁₁-Cy-Cy-CF=CFCF₂O-Ph(2F,3F)-Ph(2F,3F)—OC₂H₅
C₅H₁₁-Cy-Cy-CF=CFCF₂O-Ph(2F)-Cy-C₃H₇
C₃H₇-Cy-Cy-CF=CFCF₂O-Ph(2F,6F)-Cy-OC₂H₅
C₃H₇-Cy-Cy-CF=CFCF₂O-Ph(2F,3F)-Cy-OCH₃
C₃H₇-Ph-Ph-Ph-CF=CFCF₂O-Ph(2F)—OCF₃
C₃H₇-Ph-Ph-Ph(2F,6F)—CF=CFCF₂O-Ph(2F,6F)—F
C₃H₇-Ph-Ph(2F)-Ph(2F,6F)—CF=CFCF₂O-Ph(2F,6F)—CN
C₂H₅-Ph-Ph(2F,6F)-Ph-CF=CFCF₂O-Ph(2F)—CN
CH₃—CH=CH—C₂H₄-Ph-Ph-Ph-CF=CFCF₂O-Ph(2F)—F
CH₂=CH-Cy-Cy-Cy-CF=CFCF₂O-Ph(2F)—OCF₃
C₃H₇-Cy-Cy-Cy-CF=CFCF₂O-Ph(2F,6F)—F
C₃H₇-Cy-Cy-Cy-CF=CFCF₂O-Ph(2F,3F)—OC₂H₅
C₂H₅O-Cy-Cy-Ph-CF=CFCF₂O-Ph(2F)—OCF₃
C₃H₇-Cy-Cy-Ph-CF=CFCF₂O-Ph(2F,6F)—F
C₃H₇-Cy-Cy-Ph(2F)—CF=CFCF₂O-Ph(2F,6F)—CN
C₃H₇-Cy-Cy-Ph-CF=CFCF₂O-Ph(2F,3F)—OC₂H₅
C₃H₇-Cy-Ph-Ph-CF=CFCF₂O-Ph(2F)—OCF₃
C₃H₇-Cy-Ph-Ph(2F,6F)—CF=CFCF₂O-Ph(2F,6F)—F
C₃H₇-Cy-Ph(2F)-Ph(2F,6F)—CF=CFCF₂O-Ph(2F,6F)—CN
C₂H₅-Cy-Ph(2F,6F)-Ph-CF=CFCF₂O-Ph(2F)—CN
CH₂=CH-Cy-Ph-Ph-CF=CFCF₂O-Ph(2F)—F.

Examples of the 5 ring compound (those wherein 3 of a to e are 1 and other 2 are 0) include:
C₃H₇-Ph-Ph-Ph-Ph-CF=CFCF₂O-Ph(2F)—F
C₃H₇-Ph-Ph-Ph-Ph(2F,6F)—CF=CFCF₂O-Ph(2F,6F)—F
C₃H₇-Ph-Ph-Ph(2F)-Ph(2F,6F)—CF=CFCF₂O-Ph(2F,6F)—CN
C₂H₅-Ph-Ph-Ph(2F,6F)-Ph-CF=CFCF₂O-Ph(2F)—CN
CH₃—CH=CH—C₂H₄-Ph-Ph-Ph-Ph-CF=CFCF₂O-Ph(2F)—F
CH₂=CH-Cy-Cy-Cy-Ph-CF=CFCF₂O-Ph(2F)—OCF₃
C₃H₇-Cy-Cy-Cy-Ph-CF=CFCF₂O-Ph(2F,6F)—F
C₃H₇-Cy-Cy-Cy-Ph-CF=CFCF₂O-Ph(2F,3F)—OC₂H₅
C₂H₅O-Cy-Cy-Ph-Ph-CF=CFCF₂O-Ph(2F)—OCF₃
C₃H₇-Cy-Cy-Ph-Ph-CF=CFCF₂O-Ph(2F,6F)—F
C₃H₇-Cy-Cy-Ph-Ph(2F)—CF=CFCF₂O-Ph(2F,6F)—CN
C₃H₇-Cy-Cy-Ph-Ph-CF=CFCF₂O-Ph(2F,3F)—OC₂H₅
C₃H₇-Cy-Ph-Ph-Ph-CF=CFCF₂O-Ph(2F)—OCF₃
C₃H₇-Cy-Ph-Ph-Ph(2F,6F)—CF=CFCF₂O-Ph(2F,6F)—F
C₃H₇-Cy-Ph-Ph(2F)-Ph(2F,6F)—CF=CFCF₂O-Ph(2F,6F)—CN
C₂H₅-Cy-Ph-Ph(2F,6F)-Ph-CF=CFCF₂O-Ph(2F)—CN
C₃H₇-Cy-Ph-Ph-Ph-CF=CFCF₂O-Ph(2F,6F)—F
CH₂=CH-Cy-Ph-Ph-Ph-CF=CFCF₂O-Ph(2F)—F
C₃H₇-Ph-Ph-Ph-CF=CFCF₂O-Ph-Ph(2F)—F
C₃H₇-Ph-Ph(2F,6F)—CF=CFCF₂O-Ph-Ph(2F,6F)—F
C₃H₇-Ph-Ph(2F)-Ph(2F,6F)—CF=CFCF₂O-Ph-Ph(2F,6F)—CN
C₂H₅-Ph-Ph(2F,6F)-Ph-CF=CFCF₂O-Ph(2F)—CN
CH₃—CH=CH—C₂H₄-Ph-Ph-Ph-CF=CFCF₂O-Ph-Ph(2F)—F
CH₂=CH-Cy-Cy-Cy-CF=CFCF₂O-Ph-Ph(2F)—OCF₃
C₃H₇-Cy-Cy-Cy-CF=CFCF₂O-Ph-Ph(2F,6F)—F
C₃H₇-Cy-Cy-Cy-CF=CFCF₂O-Ph-Ph(2F,3F)—OC₂H₅

C₂H₅O-Cy-Cy-Ph-CF=CFCF₂O-Ph-Ph(2F)—OCF₃
C₃H₇-Cy-Cy-Ph-CF=CFCF₂O-Ph-Ph(2F,6F)—F
C₃H₇-Cy-Cy-Ph(2F)—CF=CFCF₂O-Ph-Ph(2F,6F)—CN
C₃H₇-Cy-Cy-Ph-CF=CFCF₂O-Ph-Ph(2F,3F)—OC₂H₅
C₃H₇-Cy-Ph-Ph-CF=CFCF₂O-Ph-Ph(2F)—OCF₃
C₃H₇-Cy-Ph-Ph(2F,6F)—CF=CFCF₂O-Ph-Ph(2F,6F)—F
C₃H₇-Cy-Ph(2F)-Ph(2F,6F)—CF=CFCF₂O-Ph-Ph(2F,6F)—CN
C₂H₅-Cy-Ph(2F,6F)-Ph-CF=CFCF₂O-Ph-Ph(2F)—CN
C₃H₇-Cy-Ph-Ph-CF=CFCF₂O-Ph-Ph(2F,6F)—F
CH₂=CH-Cy-Ph-Ph-CF=CFCF₂O-Ph-Ph(2F)—F
C₃H₇-Ph-Ph-CF=CFCF₂O-Ph-Ph(2F)—F
C₃H₇-Ph-Ph(2F,6F)—CF=CFCF₂O-Ph-Ph-Ph(2F,6F)—F
C₃H₇-Ph(2F)-Ph(2F,6F)—CF=CFCF₂O-Ph-Ph-Ph(2F,6F)—CN
C₂H₅-Ph(2F,6F)-Ph-CF=CFCF₂O-Ph-Ph(2F)—CN
CH₃—CH=CH—C₂H₄-Ph-Ph-CF=CFCF₂O-Ph-Ph-Ph(2F)—F
CH₂=CH-Cy-Cy-CF=CFCF₂O-Ph-Cy-Ph(2F)—OCF₃
C₃H₇-Cy-Cy-CF=CFCF₂O-Ph-Cy-Ph(2F,6F)—F
C₃H₇-Cy-Cy-CF=CFCF₂O-Ph-Cy-Ph(2F,3F)—OC₂H₅
C₂H₅O-Cy-Cy-CF=CFCF₂O-Ph-Ph-Ph(2F)—OCF₃
C₃H₇-Cy-Cy-CF=CFCF₂O-Ph-Ph-Ph(2F,6F)—F
C₃H₇-Cy-Cy-CF=CFCF₂O-Ph-Ph(2F)-Ph(2F,6F)—CN
C₃H₇-Cy-Cy-CF=CFCF₂O-Ph-Ph(2F,3F)—OC₂H₅
C₃H₇-Cy-Ph-CF=CFCF₂O-Ph-Ph-Ph(2F)—OCF₃
C₃H₇-Cy-Ph(2F,6F)—CF=CFCF₂O-Ph-Ph-Ph(2F,6F)—F
C₃H₇-Cy-Ph(2F)—CF=CFCF₂O-Ph-Ph(2F,6F)-Ph(2F,6F)—CN O₂H₅-Cy-Ph(2F,6F)—CF=CFCF₂O-Ph-Ph-Ph(2F)—CN
C₃H₇-Cy-Ph-CF=CFCF₂O-Ph-Ph-Ph(2F,6F)—F
CH₂=CH-Cy-Ph-CF=CFCF₂O-Ph-Ph-Ph(2F)—F.

In the formulae as mentioned above,
Cy represents trans-1,4-cyclohexylene group,
Ph represents 1,4-phenylene group,
Ph(2F) represents 2-fluoro-1,4-phenylene group,
Ph(2F,6F) represents 2,6-difluoro-1,4-phenylene group, and
Ph(2F,3F) represents 2,3-difluoro-1,4-phenylene group.

Comparative Example 1

The following compound (C1) was synthesized by using p-(trans-4-n-propylcyclohexyl)iodobenzene for the iodobenzene derivative of Example 3 in JP A 06-329566.

Chemical Formula 13

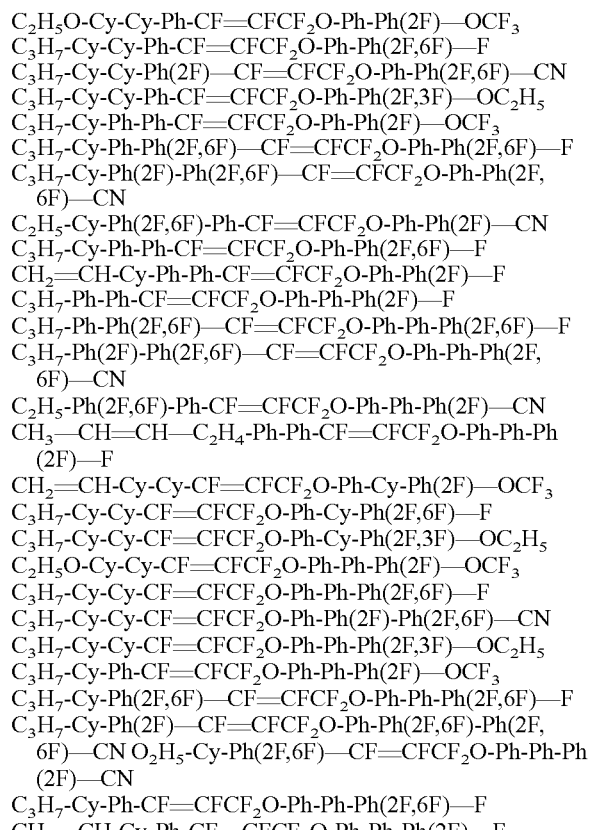

(C1)

The resulting compound (C1) had the ¹⁹F-NMR as described below.
¹⁹F-NMR (282.6 MHz, solvent: CDCl₃, standard: CFCl₃) δ (ppm): −134.1 (m, 2F), −148.5 (d, 1F), −154.6 (d, 1F), −159.2 (m, 1F)

Comparative Example 2

The following compound (C1) was synthesized by using p-(trans-4-n-propylcyclohexyl)iodobenzene for the iodobenzene derivative of Example 2 in JP A 06-329566.

[Chemical Formula 14]

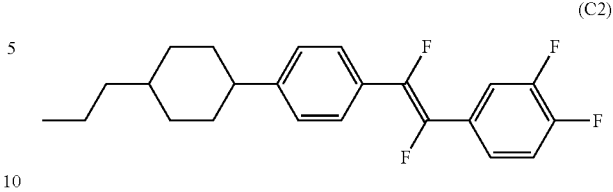

(C2)

Observation of Compatibility

To a liquid crystal composition "ZLI-1565" manufactured by Merck & Co., Inc., the compound (1A) of the present invention produced in Example 1 and the compound (C1) produced in Comparative Example 1 were added at an amount shown in Table 1, below, and after the dissolution, the mixture was stored at 0° C. After 72 hours, the state of the composition was visually observed.

The procedure as described above was repeated by using the compound (1B) produced in Example 2 and the compound (C2) produced in Comparative Example 2. The results of the observation are shown in Table 2, below.

The case with no solid precipitation is indicated by "A", and the case with solid precipitation is indicated by "B". The results are shown in the Tables, below.

TABLE 1

|  | Content | | | |
| --- | --- | --- | --- | --- |
|  | 5% by weight | 10% by weight | 20% by weight | 30% by weight |
| Compound (1A) | A | A | A | A |
| Compound (C1) | A | B | B | B |

TABLE 2

|  | Content | | | |
| --- | --- | --- | --- | --- |
|  | 5% by weight | 10% by weight | 20% by weight | 30% by weight |
| Compound (1B) | A | A | A | A |
| Compound (C2) | A | A | A | B |

Measurement of Bulk Viscosity

A liquid crystal composition comprising 80% by weight of the liquid crystal composition "ZLI-1565" manufactured by Merck & Co., Inc. and 20% by weight of the compound (1A) of the present invention 20% by weight; and a liquid crystal composition comprising 90% by weight of the liquid crystal composition "ZLI-1565" manufactured by Merck & Co., Inc. and 10% by weight of the compound (1C) of the present invention were prepared. As a Comparative Example, a liquid crystal composition comprising 95% by weight of the liquid crystal composition "ZLI-1565" manufactured by Merck & Co., Inc. and 5% by weight of the compound (C1) was also prepared. These liquid crystal compositions were measured for their viscosity at 25° C. and 0° C. using Model E viscometer, and the viscosity was calculated by extrapolation. The results are shown in Table 3.

For the compounds (1B) and (C2), a liquid crystal composition comprising 80% by weight of the liquid crystal composition "ZLI-1565" manufactured by Merck & Co., Inc. and 20% by weight of the compound (1B) or the compound (C2) was prepared, and the viscosity was measured and calculated by the same procedure. The results are shown in Table 4.

TABLE 3

|  | 25° C. | 0° C. |
|---|---|---|
| Compound (1A) | 28.81 | 211.14 |
| Compound (1C) | 62.2 | 325.5 |
| Compound (C1) | 114.3 | 795.7 |

TABLE 4

|  | 25° C. | 0° C. |
|---|---|---|
| Compound (1B) | 20.6 | 85.1 |
| Compound (C2) | 22.6 | 92.4 |

Measurement of Dielectric Anisotropy ($\Delta \epsilon$)

Dielectric anisotropy was measured by using a liquid crystal composition prepared by mixing the compound of the present invention with the liquid crystal composition "ZLI-1565" manufactured by Merck & Co., Inc. More specifically, 20% by mole of the compound (1A), the compound (1B), or the compound (C2) was mixed with 80% by mole of the "ZLI-1565", while 10% by mole of the compound (1C), the compound (1E), the compound (1F), the compound (1H), or the compound (1I) was mixed with 90% by mole of the "ZLI-1565" 90% by mole. 5% by mole of the compound (C1) was mixed with 95% by mole of the "ZLI-1565".

The mixture was encapsulated in a glass cell comprising two horizontal glass plate placed at an interval of 8 μm. A voltage of 100 mV was applied to this cell to measure dielectric constant in minor axis direction ($\epsilon \perp$), and a voltage of 88 V was applied to this cell to measure dielectric constant in major axis direction ($\epsilon \parallel$). The dielectric anisotropy ($\Delta \epsilon$) of the compound was determined by calculating $\Delta \epsilon$ of the composition by the formula: $\Delta \epsilon = \epsilon \parallel - \epsilon \perp$, and extrapolation.

The value of $\Delta \epsilon$ at 0.85Tc is shown in Table 5, below. It is to be noted that 0.85Tc is the temperature (K) which is Tc (in terms of absolute temperature (K)) of each liquid crystal composition multiplied by 0.85.

TABLE 5

|  | $\Delta \epsilon$(0.85Tc) |
|---|---|
| Compound (1A) | 21.75 |
| Compound (1C) | 40.35 |
| Compound (1E) | 18.5 |
| Compound (1F) | 21.52 |
| Compound (1H) | 27.3 |
| Compound (1I) | 14.8 |
| Compound (C1) | 11.24 |

TABLE 6

|  | $\Delta \epsilon$(0.85Tc) |
|---|---|
| Compound (1B) | 11.4 |
| Compound (C2) | 8.8 |

As described above, the compound of the present invention was found to have a high $\Delta \epsilon$ value, especially when compared with the comparative compound having CF=CF structure. This means that use of the compound of the present invention for the liquid crystal composition enables operation at a low voltage of the liquid crystal electrooptical element when the liquid crystal electrooptical element is prepared by using such liquid crystal composition.

Measurement of Photostability

A composition comprising the liquid crystal composition ZLI-1565 manufactured by Merck & Co., Inc. and 20% by weight of the compound (1A) was prepared. A composition comprising the liquid crystal composition ZLI-1565 manufactured by Merck & Co., Inc. and 10% by weight of the compound (C1) was also prepared by the same manner.

Each composition was encapsulated in a glass cell, and irradiated with a xenon lamp.

Degree of the cis-isomerization and the decomposition of the sample was determined by measuring the Tc at a time interval of 30 minutes. The measurement was conducted 3 times for each composition, and the results are shown in Table 6. For comparison purpose, a sample solely comprising the ZLI-1565 was also prepared for the measurement.

TABLE 7

|  |  | Irradiation time (min.) | | | | Change in Tc (percentage |
|---|---|---|---|---|---|---|
|  |  | 0 | 30 | 60 | 90 | of the change) |
| Composition | (1) | 85.8 | 85.7 | 85.6 | 85.5 | −0.3 (0.3%) |
| solely | (2) | 85.7 | 85.6 | 85.7 | 85.5 | −0.2 (0.2%) |
| comprising ZLI-1565 | (3) | 85.7 | 85.7 | 85.7 | 85.5 | −0.2 (0.2%) |
| Composition | (1) | 82.4 | 82.3 | 82.2 | 82.0 | −0.4 (0.5%) |
| containing 20% | (2) | 82.4 | 82.3 | 82.2 | 82.0 | −0.4 (0.5%) |
| by weight of Compound (1A) | (3) | 82.3 | 82.3 | 82.2 | 82.0 | −0.3 (0.4%) |
| Composition | (1) | 91.2 | 88.3 | 85.9 | 83.7 | −7.5 (8.2%) |
| containing 10% | (2) | 91.3 | 88.3 | 85.8 | 83.6 | −7.7 (8.4%) |
| by weight of Compound (C1) | (3) | 91.4 | 88.5 | 85.8 | 83.8 | −7.6 (8.3%) |

Tc of the composition containing the compound (1A) exhibited no substantial change while Tc of the composition containing the compound (C1) showed great decrease. Since change of the Tc of the composition increases with the increase in the degree of the cis-isomerization and the decomposition of the compound, the results indicates that the compound (1A) of the present invention has an improved photostability over that of the compound (C1) of the Comparative Example.

As described above, the fluorine-containing liquid crystal compound of the present invention was demonstrated to have a low bulk viscosity, a high $\Delta \epsilon$, high photostability, and good compatibility. The fluorine-containing liquid crystal compound of the present invention was also found to have sufficient Tc and Δn values sufficient for use as the component of the liquid crystal composition.

As demonstrated above, use of such compound of the present invention in the liquid crystal composition enables production of a composition simultaneously enjoying a high dielectric anisotropy and a low bulk viscosity.

In order to have a high negative Δ∈ of the compound (1), at least one of A1, A2, A3, A4, A5, A6 and A7 is preferably a 2,3-difluoro-1,4-phenylene group. In addition, R1 and R2 directly bonded to the 2,3-difluoro-1,4-phenylene group are preferably alkoxy group.

In order to have a near zero Δ∈ of the compound (1), A1, A2, A3, A4, A5, A6 and A7 are preferably trans-1,4-cyclohexylene group or 1,4-phenylene. In addition, R$^1$ and R$^2$ are preferably an alkyl group, alkenyl group or alkoxy group.

Preparation of Liquid Crystal Composition

Liquid crystal composition (Liquid crystal X) used in measurement was prepared from the following components at the shown proportion. Note that Cy and Ph in the following formulae refer to those previously described.

| | |
|---|---|
| C$_3$H$_7$—Cy—COO—Ph—OC$_2$H$_5$ | 17 wt % |
| C$_3$H$_7$—Cy—COO—Ph—OC$_4$H$_9$ | 27 wt % |
| C$_4$H$_9$—Cy—COO—Ph—OC$_2$H$_5$ | 21 wt % |
| C$_5$H$_{11}$—Cy—COO—Ph—OCH$_3$ | 21 wt % |
| C$_5$H$_{11}$—Cy—COO—Ph—OC$_2$H$_5$ | 14 wt % |

10 mol % of the compound (1J), compound (1K) and compound (1L) were respectively mixed with 90 mol % of "Liquid Crystal X," and each of the resulting mixtures was encapsulated in a glass cell comprising two horizontal glass plates placed at an interval of 8 μm. A voltage of 100 mV was applied to the cells to measure dielectric constant in minor axis direction (∈⊥). Moreover, each of the mixtures was encapsulated in a glass cell comprising two vertical glass plates placed at an interval of 8 μm. A voltage of 100 mV was applied to the cells to measure dielectric constant in major axis direction ∈∥).

The dielectric anisotropy (Δ∈) of each compound was determined by calculating Δ∈ of the composition by the formula: Δ∈=∈∥−∈⊥, and extrapolation. The value of Δ∈ at 0.85Tc is shown in Table 8 below.

TABLE 8

| | Δε(0.85Tc) |
|---|---|
| Compound (1J) | −3.25 |
| Compound (1K) | −2.60 |
| Compound (1L) | −1.43 |

As described above, the compound of the present invention may have a negative Δ∈ by selecting each group, and it is expected that the compound of the present invention may be used in the operating mode making use of vertical orientation.

The compounds of the present invention may have a dielectric anisotropy of from −8 to 2. This range includes all values and subranges therebetween, including −7, −6, −5, −4, −3, −2, −1, 0.5, 0, 0.5, 1 and 1.5. The range of from −4 to 0 is one preferred embodiment of the present invention.

The invention claimed is:

1. A liquid crystal compound represented by the following formula (1):

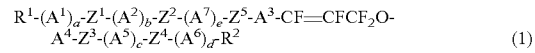

$$R^1-(A^1)_a-Z^1-(A^2)_b-Z^2-(A^7)_e-Z^5-A^3-CF=CFCF_2O-A^4-Z^3-(A^5)_c-Z^4-(A^6)_d-R^2 \quad (1)$$

wherein

R$^1$ and R$^2$ independently represent hydrogen atom, a halogen atom, —CN, —NCS, —SF$_5$, or an alkyl group containing 1 to 18 carbon atoms, wherein at least one hydrogen atom in the group is optionally substituted with fluorine atom, at least one —CH$_2$— in the group is optionally substituted with ethereal oxygen atom or thioethereal sulfur atom, and at least one —CH$_2$CH$_2$— in the group is optionally substituted with —CH═CH— or —C≡C—, A$^1$, A$^2$, A$^3$, A$^4$, A$^5$, A$^6$ and A$^7$ independently represent trans-1,4-cyclohexylene group, 1,4-cyclohexenylene group, 1,3-cyclobutylene group, 1,2-cyclopropylene group, naphthalene-2,6-diyl group, 1,2,3,4-tetrahydronaphthalene-2,6-diyl group, decahydronaphthalene-2,6-diyl group, or 1,4-phenylene group, wherein at least one hydrogen atom in the group is optionally substituted with a halogen atom, one or two ═CH— in the group is optionally substituted with nitrogen atom, and one or two —CH$_2$— in the group is optionally substituted with ethereal oxygen atom or thioethereal sulfur atom, Z$^1$, Z$^2$, Z$^3$, Z$^4$, and Z$^5$ independently represent single bond, an alkylene group containing 1 to 4 carbon atoms wherein at least one hydrogen atom in the group is optionally substituted with fluorine atom, and at least one —CH$_2$— in the group is optionally substituted with ethereal oxygen atom or thioethereal sulfur atom, and at least one —CH$_2$CH$_2$— in the group is optionally substituted with —CH═CH— or —C≡C—, and a, b, c, d, and e independently represent 0 or 1 with the proviso that 0≦a+b+c+d+e≦3, and wherein the compound has a dielectric anisotropy near zero or a negative dielectric anisotropy.

2. A liquid crystal compound according to claim 1 wherein the liquid crystal compound represented by the formula (1) is the compound represented by the following formula (1-0):

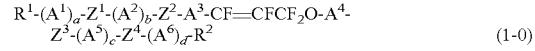

$$R^1-(A^1)_a-Z^1-(A^2)_b-Z^2-A^3-CF=CFCF_2O-A^4-Z^3-(A^5)_c-Z^4-(A^6)_d-R^2 \quad (1-0)$$

wherein

R$^1$ and R$^2$ independently represent hydrogen atom, a halogen atom, —CN, —NCS, —SF$_5$, or an alkyl group containing 1 to 18 carbon atoms, wherein at least one hydrogen atom in the group is optionally substituted with fluorine atom, at least one —CH$_2$— in the group is optionally substituted with ethereal oxygen atom or thioethereal sulfur atom, and at least one —CH$_2$CH$_2$— in the group is optionally substituted with —CH═CH— or —C≡C—, A$^1$, A$^2$, A$^3$, A$^4$, A$^5$, and A$^6$ independently represent trans-1,4-cyclohexylene group, 1,4-cyclohexenylene group, 1,3-cyclobutylene group, 1,2-cyclopropylene group, naphthalene-2,6-diyl group, 1,2,3,4-tetrahydronaphthalene-2,6-diyl group, decahydronaphthalene-2,6-diyl group, or 1,4-phenylene group, wherein at least one hydrogen atom in the group is optionally substituted with a halogen atom, one or two ═CH— in the group is optionally substituted with nitrogen atom, and one or two —CH$_2$— in the group is optionally substituted with ethereal oxygen atom or thioethereal sulfur atom, Z$^1$, Z$^2$, Z$^3$, and Z$^4$ independently represent single bond, an alkylene group containing 1 to 4 carbon atoms wherein at least one hydrogen atom in the group is optionally substituted with fluorine atom, at least one —$CH_2$— in the group is optionally substituted with ethereal oxygen atom or thioethereal sulfur atom, and at least one —$CH_2CH_2$— in the group is optionally substituted with —CH=CH— or —C≡C—, and a, b, c, and d independently represent 0 or 1 with the proviso that 0≦a+b+c+d≦3.

3. A liquid crystal compound according to claim 2 wherein the liquid crystal compound represented by the formula (1-0) is the compound represented by the following formula (1-1):

$$R^{11}\text{-}(A^{11})_a\text{-}Z^{11}\text{-}(A^{21})_b\text{-}Z^{21}\text{-}A^{31}\text{-}CF\text{=}CFCF_2O\text{-}A^{41}\text{-}Z^{31}\text{-}(A^{51})_c\text{-}Z^{41}\text{-}(A^{61})_d\text{-}R^{21} \quad (1\text{-}1)$$

wherein $R^{11}$ and $R^{21}$ independently represent hydrogen atom, fluorine atom, —$SF_5$, or an alkyl group containing 1 to 18 carbon atoms, wherein at least one hydrogen atom in the group is optionally substituted with fluorine atom, at least one —$CH_2$— in the group is optionally substituted with ethereal oxygen atom or thioethereal sulfur atom, and at least one —$CH_2CH_2$— in the group is optionally substituted with —CH=CH—, $A^{11}, A^{21}, A^{31}, A^{41}, A^{51}$, and $A^{61}$ independently represent trans-1,4-cyclohexylene group or 1,4-phenylene group, wherein at least one hydrogen atom in the group is optionally substituted with a halogen atom, one or two =CH— in the group is optionally substituted with nitrogen atom, and one or two —$CH_2$— in the group is optionally substituted with ethereal oxygen atom or thioethereal sulfur atom, $Z^{11}, Z^{21}, Z^{31}$, and $Z^{41}$ independently represent single bond, an alkylene group containing 1 to 4 carbon atoms wherein at least one hydrogen atom in the group is optionally substituted with fluorine atom, and at least one —$CH_2$— in the group is optionally substituted with ethereal oxygen atom, and a, b, c, and d are as defined above.

4. A liquid crystal compound according to claim 2 wherein the liquid crystal compound represented by the formula (1-0) is the compound represented by the following formula (1-2):

$$R^{12}\text{-}(A^{12})_a\text{-}Z^{12}\text{-}(A^{22})_b\text{-}Z^{22}\text{-}A^{32}\text{-}CF\text{=}CFCF_2O\text{-}A^{42}\text{-}Z^{32}\text{-}(A^{52})_c\text{-}Z^{42}\text{-}(A^{62})_d\text{-}R^{22} \quad (1\text{-}2)$$

wherein $R^{12}$ represents hydrogen atom or an alkyl group containing 1 to 10 carbon atoms, wherein at least one hydrogen atom in the group is optionally substituted with fluorine atom, and at least one —$CH_2$— in the group is optionally substituted with ethereal oxygen atom, $R^{22}$ represents hydrogen atom, fluorine atom, —$SF_5$, or an alkyl group containing 1 to 18 carbon atoms, wherein at least one hydrogen atom in the group is optionally substituted with fluorine atom, and at least one —$CH_2$— in the group is optionally substituted with ethereal oxygen atom, $A^{12}, A^{22}, A^{32}, A^{42}, A^{52}$ and $A^{62}$ independently represent trans-1,4-cyclohexylene group, 1,4-phenylene group, or 1,4-phenylene group wherein one or two hydrogen atoms in the group is optionally substituted with fluorine atom, $Z^{12}, Z^{22}, Z^{32}$ and $Z^{42}$ independently represent single bond or an alkylene group containing 1 to 4 carbon atoms, and a, b, c, and d are as defined above.

5. A method for producing the liquid crystal compound as definwed in claim 1, comprising the step of reacting the compound represented by the following formula (2):

$$CF_2\text{=}CFCF_2O\text{-}A^4\text{-}Z^3\text{-}(A^5)_c\text{-}Z^4\text{-}(A^6)_d\text{-}R^2 \quad (2)$$

with the compound represented by the following formula (3):

$$R^1\text{-}(A^1)_a\text{-}Z^1\text{-}(A^2)_b\text{-}Z^2\text{-}(A^7)_e\text{-}Z^5\text{-}A^3\text{-}M \quad (3)$$

wherein $R^1, R^2, A^1, A^2, A^3, A^4, A^5, A^6, A^7, Z^1, Z^2, Z^3, Z^4, Z^5$, a,b,c,d and e are as defined in claim 1; and M is a metal atom or a group containing a metal atom.

6. A liquid crystal composition containing a liquid crystal compound of claim 1.

7. A liquid crystal composition containing a liquid crystal compound of claim 2.

8. A liquid crystal composition containing a liquid crystal compound of claim 3.

9. A liquid crystal composition containing a liquid crystal compound of claim 4.

10. A liquid crystal electrooptical element having the liquid crystal composition of claim 6 introduced between two substrates each having an electrode provided thereon.

11. A liquid crystal electrooptical element having the liquid crystal composition of claim 7 introduced between two substrates each having an electrode provided thereon.

12. A liquid crystal electrooptical element having the liquid crystal composition of claim 8 introduced between two substrates each having an electrode provided thereon.

13. A liquid crystal electrooptical element having the liquid crystal composition of claim 9 introduced between two substrates each having an electrode provided thereon.

14. A liquid crystal compound according to claim 1, which has a dielectric anisotropy near zero.

15. A liquid crystal compound according to claim 1, which has a negative dielectric anisotropy.

16. A liquid crystal compound according to claim 1, wherein at least one of $A^1, A^2, A^3, A^4, A^5, A^6$ and $A^7$ is a 2,3-difluoro-1,4-phenylene group.

17. A liquid crystal compound according to claim 16, wherein $R^1$ and $R^2$ directly bonded to the 2,3-difluoro-1,4-phenylene group are alkoxy groups.

18. A liquid crystal compound according to claim 1, wherein $A^1, A^2, A^3, A^4, A^5, A^6$ and $A^7$ are a trans-1,4-cyclohexylene group or a 1,4-phenylene group.

19. A liquid crystal compound according to claim 18, wherein $R^1$ and $R^2$ are an alkyl group, alkenyl group or alkoxy group.

20. A liquid crystal compound according to claim 1, which has a dielectric anisotropy of from −4 to 2.

21. A liquid crystal compound according to claim 18, which has a dielectric anisotropy of from −4 to 0.

22. A liquid crystal compound according to claim 1, which has a dielectric anisotropy of from −8 to 2.

23. A liquid crystal compound according to claim 1, which has a dielectric anisotropy of from −8 to 0.

24. A liquid crystal compound according to claim 1, which has a dielectric anisotropy of from −4 to 0.

* * * * *